United States Patent
Wu et al.

(10) Patent No.: US 10,482,674 B1
(45) Date of Patent: Nov. 19, 2019

(54) SYSTEM AND METHOD FOR MOBILE AUGMENTED REALITY

(71) Applicants: Beijing Jingdong Shangke Information Technology Co., Ltd., Beijing (CN); JD.com American Technologies Corporation, Mountain View, CA (US)

(72) Inventors: Yuzhang Wu, Santa Clara, CA (US); Yi Xu, Menlo Park, CA (US); Dan Miao, San Jose, CA (US); Hui Zhou, Sunnyvale, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 0 days.

(21) Appl. No.: 16/020,920

(22) Filed: Jun. 27, 2018

(51) Int. Cl.
G06T 19/00 (2011.01)
G06T 19/20 (2011.01)
G06T 17/05 (2011.01)
G06N 20/00 (2019.01)

(52) U.S. Cl.
CPC ........... *G06T 19/006* (2013.01); *G06N 20/00* (2019.01); *G06T 17/05* (2013.01); *G06T 19/20* (2013.01)

(58) Field of Classification Search
None
See application file for complete search history.

(56) References Cited

U.S. PATENT DOCUMENTS

| 2014/0168268 A1* | 6/2014 | Oi | G06T 19/006 345/633 |
| 2015/0062120 A1* | 3/2015 | Reisner-Kollmann | G06T 17/00 345/419 |
| 2018/0121988 A1* | 5/2018 | Hiranandani | G06T 7/74 |
| 2018/0190033 A1* | 7/2018 | Barnett | G06K 9/6256 |

OTHER PUBLICATIONS

Li et al., "Monocular Semantic SLAM using Object-pose-graph Constraints" IEEE, 2016. (Year: 2016).*
Tong Qin, Peiliang Li, & Shaojie Shen, VINS-Mono: A Robust and Versatile Monocular Visual-Inertial State Estimator, arXiv, 2017, 1708.03852.
Matt Miesnieks, Why is ARKit better than the alternatives?, https://medium.com/6d-ai/why-is-arkit-better-than-the-alternatives-af8871889d6a , 2018.
Wikipedia, Point set registration, https://en.wikipedia.org/wiki/Point_set_registration , 2018.

* cited by examiner

*Primary Examiner* — Nicholas R Wilson
(74) *Attorney, Agent, or Firm* — China Science Patent & Trademark US LLC; Shanyun Lu

(57) ABSTRACT

A system and method for realizing augmented reality. The system includes a visual sensor configured to capture images of an environment and a computing device in communication with the visual sensor. The computing device has a processor and a storage device storing computer executable code. The computer executable code, when executed at the processor, is configured to: identify two-dimensional (2D) objects in the captured images; construct a three-dimensional (3D) map of the environment using the captured images; define 3D objects in the 3D map by mapping the 2D objects identified in the captured images to the corresponding points in the 3D map; and render a 3D model on the 3D map based on the 3D objects defined in the 3D map.

17 Claims, 11 Drawing Sheets

SYSTEM AND METHOD FOR MOBILE AUGMENTED REALITY

CROSS-REFERENCES

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to augmented reality, and more particularly to a cross-platform system and method for recommending and placing virtual objects into a real environment.

BACKGROUND OF THE INVENTION

The background description provided herein is for the purpose of generally presenting the context of the invention. Work of the presently named inventors, to the extent it is described in this background section, as well as aspects of the description that may not otherwise qualify as prior art at the time of filing, are neither expressly nor impliedly admitted as prior art against the present invention.

Augmented reality (AR) is a direct or indirect live view of a physical, real-world environment whose elements are "augmented" by computer-generated perceptual information, ideally across multiple sensory modalities, including visual, auditory, haptic, somatosensory, and olfactory. A user may use AR to combine virtual objects with real environment and bring a feeling that virtual objects are part of the real world. With the wide adoption of mobile devices and wearable devices, AR is easily accessible to consumers for gaming, shopping, education, sightseeing, etc. However, it is a challenge to fit a virtual object into a real environment smoothly at real time.

Therefore, an unaddressed need exists in the art to address the aforementioned deficiencies and inadequacies.

SUMMARY OF THE INVENTION

In certain aspects, the present invention relates to a system for realizing augmented reality. In certain embodiments, the system includes: a visual sensor configured to capture images of an environment and a computing device in communication with the visual sensor. The computing device has a processor and a storage device storing computer executable code. The computer executable code, when executed at the processor, is configured to: identify two-dimensional (2D) objects in the captured images; construct a three-dimensional (3D) map of the environment using the captured images; define 3D objects in the 3D map by mapping the 2D objects identified in the captured images to the corresponding feature points in the 3D map; and place and render a 3D model to the 3D map based on the 3D objects defined in the 3D map.

In certain embodiments, the computer executable code is further configured to define 3D objects by determining horizontal planes and vertical planes of the 3D objects. In certain embodiments, the computer executable code is further configured to: detect collision between virtual objects and real physical objects, that is, between the 3D model and the 3D objects, based on the planes of the 3D objects. In certain embodiments, the planes include horizontal planes, vertical planes, and/or planes with arbitrary orientations in the 3D map.

In certain embodiments, the computer executable code is further configured to: measure dimension of the objects. In certain embodiments, the computer executable code is further configured to: projecting the 2D objects identified from images to the 3D map to measure dimension of 3D objects corresponding to the 2D objects, and recommend 3D virtual models based on the dimension of the real 3D objects. In certain embodiments, the computer executable code is further configured to: place the one or more 3D models in positions in the 3D map based on the dimension of the real objects.

In certain embodiments, the computer executable code is further configured to: recognize function and style of the 2D objects using machine learning. In certain embodiments, the computer executable code is further configured to: recommend 3D virtual models based on the function and style of the objects. In certain embodiments, the computer executable code is further configured to: place the 3D models in positions in the 3D map based on the function and style of the real objects.

In certain embodiments, the computer executable code is configured to recognize the classification of the scene, such as a bedroom, a living room, or a bathroom. In certain embodiments, the computer executable code is configured to recognize character or name of the 2D objects in the 2D images. The recognized name of the 2D objects include dining table, study desk, sofa, etc.

In certain embodiments, the computer executable code is configured to: identify the 2D objects using an image/point processing module; and render the 3D model on the 3D map using a rendering module. Both the image/point processing module and the rendering module are coded using C++.

In certain embodiments, the computer executable code is configured to define 3D objects in the 3D map by: determining a plurality of 2D feature points in the captured images that correspond to one of the 2D objects; determining a plurality of 3D feature points in the 3D map that correspond to the determined 2D feature points; and adding an object label to the determined 3D feature points to define 3D objects corresponding to the 2D objects.

In certain embodiments, the computer executable code is further configured to: operate the 3D model on the 3D map in response to a gesture or speech of a user; and define coordinate relationship of the 3D map with another 3D map in another computing device.

In certain aspects, the present invention relates to a method for realizing augmented reality using a visual sensor and a computing device in communication with the visual sensor. The method includes: capturing images of an environment by the visual sensor; identifying, by the computing device, two-dimensional (2D) objects in the captured images; constructing, by the computing device, a three-dimensional (3D) map of the environment using the captured images; defining, by the computing device, 3D objects in the 3D map by mapping the 2D objects identified in the captured images to the corresponding feature points in the 3D map; and placing and rendering, by the computing device, 3D models to the 3D map based on the 3D objects defined in the 3D map.

In certain embodiments, the method further includes defining the 3D objects in the 3D map by determining planes of the 3D objects. In certain embodiments, the method further includes detecting collision between virtual objects (3D models of the products) and real objects (3D objects in the 3D map) based on the planes. In certain embodiments, the planes include horizontal planes, vertical planes, and/or planes with arbitrary orientations in the 3D map.

In certain embodiments, the method further includes measuring dimension of the 3D objects. In certain embodiments, the method further includes projecting the 2D objects to the 3D map to measure dimension of 3D objects corresponding to the 2D objects, and recommending the 3D models based on the dimension of the 3D objects. In certain embodiments, the method further includes placing the 3D models in positions in the 3D map based on the dimension of the 3D objects.

In certain embodiments, the method further includes recognizing function and style of 3D objects using machine learning. In certain embodiments, the method further includes placing the 3D models in positions in the 3D map based on the function and style of the 3D objects.

In certain aspects, the present invention relates to a non-transitory computer readable medium storing computer executable code. The computer executable code, when executed at a processor of a computing device, is configured to: receive images captured by a visual sensor; identify two-dimensional (2D) objects in the captured images; construct a three-dimensional (3D) map of the environment using the captured images; define 3D objects in the 3D map by mapping the 2D objects identified in the captured images to the corresponding feature points in the 3D map; and place and render one or more 3D models to the 3D map based on the 3D objects defined in the 3D map.

In certain embodiments, the computer executable code is further configured to: define 3D objects by determining planes of the 3D objects; and detect collision between virtual objects and real objects (the 3D models and the 3D objects) based on the planes of the 3D objects. In certain embodiments, the planes include horizontal planes, vertical planes, and/or planes with arbitrary orientation in the 3D map.

In certain embodiments, the computer executable code is further configured to: measure dimension; project the 2D objects to the 3D map to measure dimension of 3D objects corresponding to the 2D objects; recommend the 3D models based on the dimension of the 3D objects; and place the 3D models in positions in the 3D map based on the dimension of the 3D objects.

In certain embodiments, the computer executable code is further configured to: recognize function and style of the 2D objects using machine learning and project the recognized function and style to the 3D objects; recommend 3D models based on the function and style of the real 3D objects; and place and render 3D models in positions in the 3D map based on the function and style of the 3D objects.

These and other aspects of the present invention will become apparent from following description of the preferred embodiment taken in conjunction with the following drawings and their captions, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
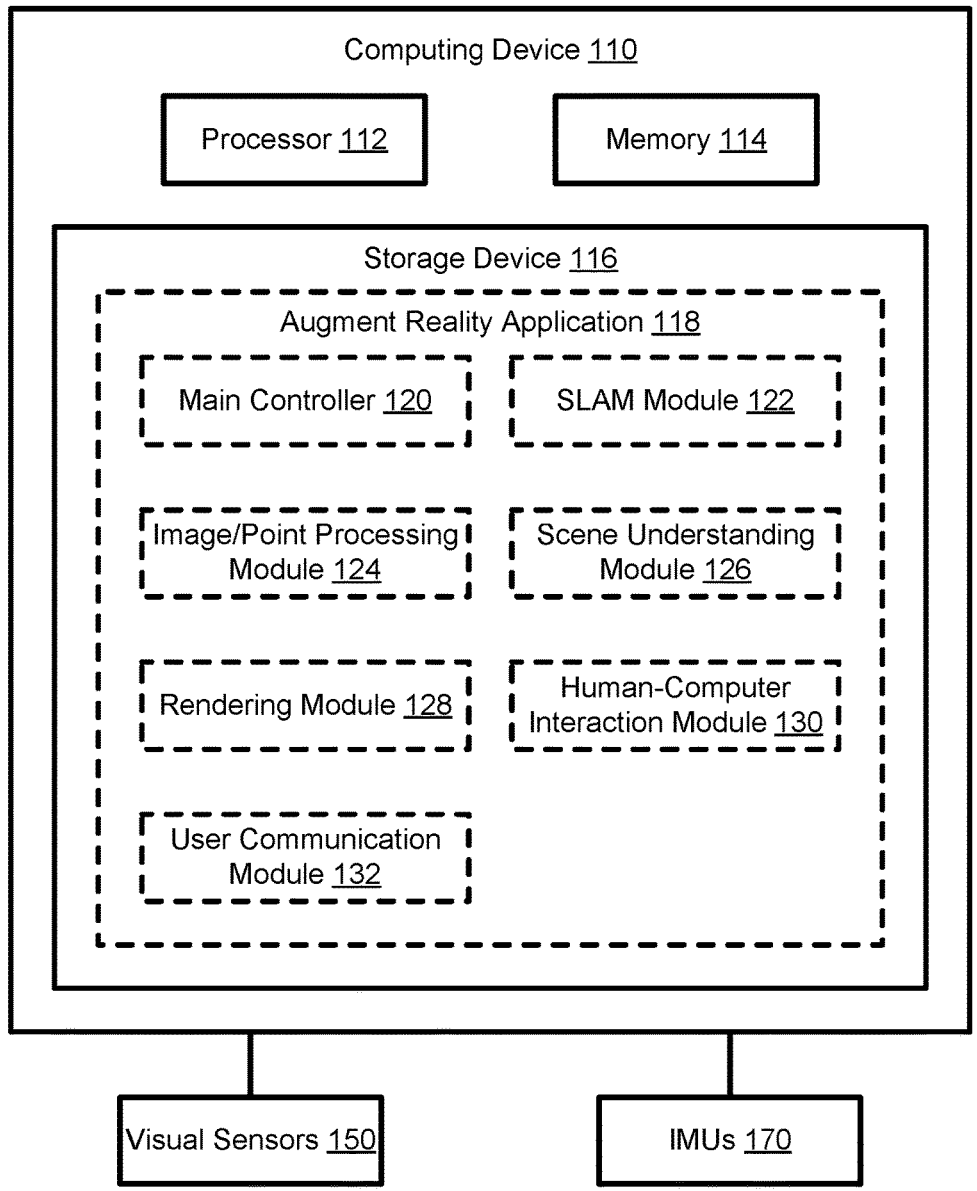
FIG. 1 schematically depicts an exemplary computing device according to certain embodiments of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present invention.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The present invention relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present invention will now be described more fully hereinafter with reference to the accompanying drawings, in which embodiments of the present invention are shown. This invention may, however, be embodied in many different forms and should not be construed as limited to the embodiments set forth herein; rather, these embodiments are provided so that this invention will be thorough and complete, and will fully convey the scope of the present invention to those skilled in the art.

In accordance with the purposes of present invention, as embodied and broadly described herein, in certain aspects, the present invention relates to an augmented reality system and method. In certain embodiments, the system and method include: (1) simultaneously constructing and updating a map for the environment while keeping track of the camera's pose regarding to the environment; (2) 3D rendering of 3D models or animation on screen in real time; and (3) intelligent scene understanding, which allows an all-new experience for automatically and intelligently placing virtual objects in the environment. Certain embodiments of the present invention, among other things, have the following beneficial advantages.

Firstly, the system and method according to certain embodiments of the present invention are cross-platform, which can be run under Apple® devices, Android™ devices, Windows® devices, etc. In certain embodiments, the system is configured for mobile AR and are easily used in e-commerce. The mobile AR system and platform can help consumers virtually "try out" the commodities in real scenes and consider whether this commodity fit the environment (e.g., whether the dimension and/or style of a piece of furniture fits the living room).

Secondly, the system includes a SLAM module, a rendering module, an image/point processing module, a scene understanding module, a human-computer interaction module, and optionally a user communication module. This complete system provides all the functions that are needed for AR, and is especially useful for AR shopping. Specifically, (1) the SLAM module uses phone's camera(s) to construct and update a map for the environment while keeping track of cameras' pose with regarding to the environment. (2) The rendering module or rendering engine is configured to visualize virtual objects within the physical environment. It can support both static rendering and dynamic animation. (3) The image/point processing module is configured to obtain features from images and use these data for subsequent operations. (4) The scene understating module is configured to process the acquired images as well as point sets acquired by the SLAM module to understand the contents and 3D geometry of the scene. To strengthen user experience, artificial intelligent is used in the scene understanding module. With the intelligent object detection and scene understanding, the virtual objects can be intelligently and automatically recommended and placed in the physical world. (5) The interaction module is configured to use gesture, voice recognition, or touchscreen interaction, to allow users to interact with virtual objects with a simple voice command or a friendly hand gesture.

Thirdly, with the intelligent object detection or/and scene understanding, the present invention is able to recommend one or more products that match the style and the dimension/size of the objects and the environment and place the product in a suitable position in the environment. For example, the system is able to recommend a modern style product to a modern style environment; recommend a suitable sized TV according to the detected size of a TV stand or TV table; and automatically place a painting on the wall surface.

FIG. 1 schematically depicts a mobile augmented reality system or platform according to certain embodiments of the present invention. In certain embodiments, the system 100 includes a computing device 110, one or more visual sensors 150, and optionally one or more inertial measurement units (IMUs) 170. The visual sensors 150 and the IMUs 170 are in communication with the computing device 110 and under control of the computing device 110. In certain embodiments, the computing device 110 may be a mobile device, a tablet, a general-purpose computer, a headless computer, a wearable device, a specialized computer, a server computer, a cluster, or a cloud computer, which provide augmented reality services. In certain embodiments, the computing device 110 is preferably one or more mobile devices, such as smart phones, wearable device, or tablets. As shown in FIG. 1, the computing device 110 may include, without being limited to, a processor 112, a memory 114, and a storage device 116. In certain embodiments, the computing device 110 may include other hardware components and software components (not shown) to perform its corresponding tasks. Examples of these hardware and software components may include, but not limited to, other required memory, interfaces, buses, Input/Output (I/O) modules or devices, network interfaces, and peripheral devices.

The processor 112 may be a central processing unit (CPU) which is configured to control operation of the computing device 110. The processor 112 can execute an operating system (OS) or other applications of the computing device 110. In some embodiments, the computing device 110 may have more than one CPU as the processor, such as two CPUs, four CPUs, eight CPUs, or any suitable number of CPUs.

The memory 114 can be a volatile memory, such as the random-access memory (RAM), for storing the data and information during the operation of the computing device 110. In certain embodiments, the memory 114 may be a volatile memory array. In certain embodiments, the computing device 110 may run on more than one memory 114.

The storage device 116 is a non-volatile data storage media for storing the OS (not shown) and other applications of the computing device 110. Examples of the storage device 116 may include non-volatile memory such as flash memory, memory cards, USB drives, hard drives, floppy disks, optical drives, or any other types of data storage devices. In certain embodiments, the computing device 110 may have multiple storage devices 116, which may be identical storage devices or different types of storage devices, and the applications of the computing device 110 may be stored in one or more of the storage devices 116 of the computing device 110. As shown in FIG. 1, the storage device 116 includes an augmented reality (AR) application 118. The AR application 118 provides a cross-platform system to provide augmented reality, for example, for online shopping.

The AR application 118 includes, among other things, a main controller 120, a simultaneous localization and mapping (SLAM) module 122, an image/point processing module 124, a scene understanding module 126, a rendering module 128, a human-computer interaction module 130, and optionally a user communication module 132. In certain embodiments, the AR application 118 may include other applications or modules necessary for the operation of the modules 120-132. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some of the modules of the AR application 118, such as the scene understanding module 126, may be located at a remote computing device for example a server computer, and the other modules of the AR application 118 communicate with the scene understanding module 126 via a wired or wireless network.

The main controller 120 is configured to receive (or retrieve) images captured by the visual sensors 150 and IMU information measured by the IMUs 170, and communicating with the SLAM module 122, the image/point processing module 124, the scene understanding module 126, the rendering module 128, the human-computer interaction module 130, and the user communication module 132. The main controller 120 inputs related data to those modules, instructs the modules to perform their respective functions, and receives or redirects the data outputted from those modules. In certain embodiments, the main controller 120 may not be necessary for the AR application 118, and the other modules communicate with each other directly without going through the main controller 120.

Figure 2A:
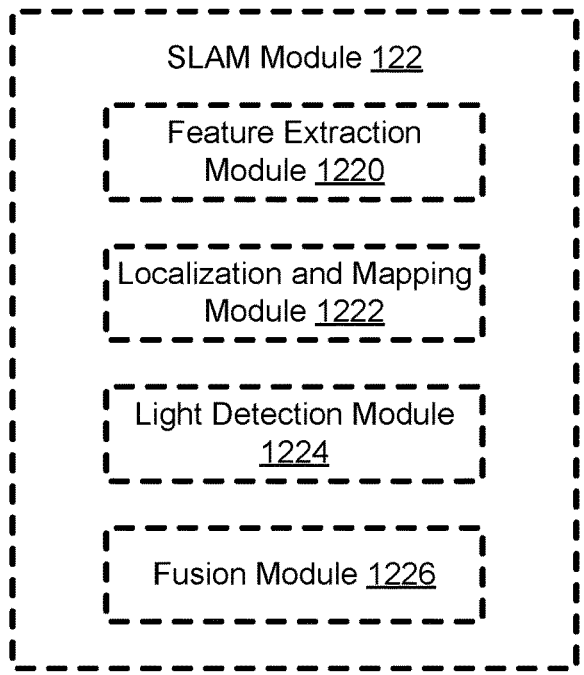
FIG. 2A schematically depicts an exemplary simultaneous localization and mapping (SLAM) module according to certain embodiments of the present invention.

The SLAM module 122 is configured to, upon receiving captured images directly from the visual sensors 150 or via the main controller 120, calculate poses of the visual sensors 150 and construct 3D map of the environment. With the continuous capturing new 2D images by the visual sensors 150, the 3D map is also updated continuously by the SLAM module 122. In certain embodiments, the poses and the 3D map are accessible by the main controller 120 and/or other related modules, such as the image/point processing module 124 and the scene understanding module 126. The visual sensors 150 may be one or more cameras. The poses of the camera may be represented as a three-degree translation and a three-degree rotation, and the 3D map may be a point map that is formed as point cloud of feature points. Each feature point has a specific feature descriptor based on the feature of the corresponding feature point in the 2D images. As shown in FIG. 2A, the SLAM module 122 includes a feature extraction module 1220, a localization and mapping module 1222, and optionally at least one of a light detection module 1224, and a fusion module 1226. In certain embodiments, the feature extraction module 1220 is configured to detect features and extract feature points from the captured images, and calculate feature descriptors for the feature points. In certain embodiments, the feature detection includes detection of corners from the images. Corners are regions with a high gradient variation and are easily recognizable in different images. Therefore, corners are preferred type of features to track in the 2D images. The localization and mapping module 1222 is configured to perform the main function of the SLAM module 122, that is, determine the poses of the camera and construct the 3D map of the environment using the extracted feature points. The light detection module 1224 is configured to detect light in the environment in relation to the feature points in the 3D map. For example, multiple light sources in the environment can be determined based on the surfels detected in the 3D map. In certain embodiments, the system 100 further includes the IMUs 170, and the fusion module 1226 is configured to fuse the inertial data collected by the IMUs 170 with the visual data captured by the visual sensors 150, to aid the SLAM process. In certain embodiments, the SLAM module 122 may be provided by ARKit, ARCore, or other customized SLAM modules.

Figure 2B:
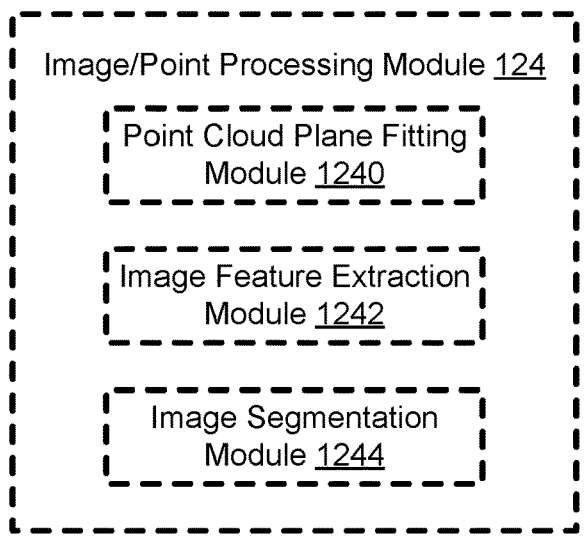
FIG. 2B schematically depicts an exemplary image/point processing module according to certain embodiments of the present invention.

The image/point processing module 124 is configured to extract features from 2D images, and detect and fit planes from point clouds. The 2D images may be received directly from the visual sensors 150 or via the main controller 120, or in certain embodiments, the 2D images used by the image/point processing module 124 are the same 2D images used by the SLAM module 122. In certain embodiments, the point cloud data and camera poses are obtained from the SLAM module 122. The 3D map in SLAM, after updated by the image/point processing module 124 with plane information, is named 3D plane map, where plane information is added as associated plane labels of the feature points in the 3D map. The 3D plane map is continuously updated by the SLAM module 122, the only difference is that the feature points in the 3D plane map not only include feature descriptors and light information, but also include associated plane information. As shown in FIG. 2B, the image/point processing module 124 includes a point cloud plane fitting module 1240, an image feature extraction module 1242, and an image segmentation module 1244. The point cloud plane fitting module 1240 adds plane information to the 3D map, while the image feature extraction module 1242, and the image segmentation module 1244 obtain features, as well as segmentation information from the 2D images.

The point cloud plane fitting module 1240 is configured to fit both horizontal and vertical planes, and optionally planes forming variant angles with the horizontal and vertical planes. Specifically, the point cloud plane fitting module 1240 detects multiple 3D points that belong to a plane such as a vertical plane, and determines the boundaries of the vertical plane based on the distribution of those 3D feature points. The point cloud plane fitting module 1240 then labels the vertical plane having boundaries in the 3D map. In certain embodiments, the point cloud plane fitting module 1240 may use parameterized representation to define the planes. In one example, the point cloud plane fitting module 1240 uses a center point, length and width of a plane, and a normal direction to define the plane. In one example, the point cloud plane fitting module 1240 uses one point on the plane and a plane orientation to define the plane. In one example, the plane is defined by $Ax+By+Cz+D=0$, where x, y, z are 3D coordinates of points belonging to the plane, and the four parameters A, B, C and D are constants. In certain embodiments, the point cloud plane fitting module 1240 may use a non-parameterized representation of the plane by labeling a set of feature points as belonging to that plane, so as to define the plane. Those labels are now part of the 3D map. The 3D map from SLAM, after incorporating information of horizontal, vertical planes and possible planes along other directions, is defined as 3D plane map. This 3D plane map is continuously updated by both the SLAM module 122 and the image/point processing module 124.

The image feature extraction module 1242 is configured to extract features other than corners from the 2D images. In certain embodiments, the image feature extraction module 1242 is configured to extract more features from the images than the feature extraction module 1220. The feature extraction module 1220 is configured to detect features such as corners or other limited number of features from the image, so as to track the feature in the images easily to perform SLAM. In contrast, the image feature extraction module 1242 is configured to extract more complex feature for scene recognition, such as edges, blob, ridge, lines, circles, planes, etc. In certain embodiments, the image feature extraction module 1242 detects and extracts features learned by machine learning, especially deep learning, methods, etc. The detected features in the 2D images here can then be used by the scene understanding module 126. When the corners and other features are detected or extracted from the 2D images, the image segmentation module 1244 segments the images based on the detected features. In certain embodiments, the 2D features extracted by the image feature extraction module 1242 can also be re-projected to the 3D map.

In certain embodiments, the image/point processing module 124 is coded using C++, which can be run under either Android™ or iOS™. Accordingly, the AR application 118 according to certain embodiments of the present invention can be used as a cross-platform application.

The scene understanding module 126 is configured to, upon receiving the features and segmentations from the 2D images, detect and recognize objects in the 2D images, and project the recognized objects in the 2D images to the 3D plane map, to update the 3D plane map to form a 3D scene map. The obtained 3D scene map is still part of the SLAM, and is continuously updated by the SLAM module 122 with updated feature points from new 2D images, updated by the image/point processing module 124 with updated plane information, and updated by the scene understanding module 126 with object information. The 3D scene map can then be used by the rendering module 128. In certain embodiments, the scene understanding module 126 is configured to recommend one or more products to a user based on the 3D scene map.

Figure 2C:
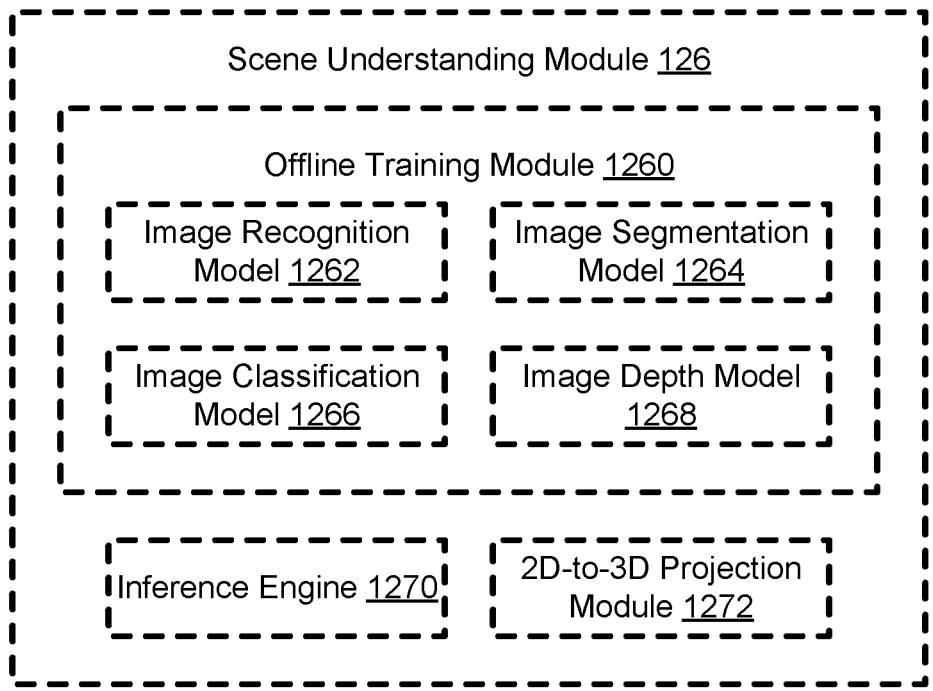
FIG. 2C schematically depicts an exemplary scene understanding module according to certain embodiments of the present invention.

As shown in FIG. 2C, the scene understanding module 126 includes an offline training module 1260, an inference engine 1270, and a 2D-to-3D projection module 1272. The offline training module 1260 is configured to train different machine learning models using labeled image dataset and optionally unlabeled image dataset. In certain embodiments, when the models are trained in advance, the well-trained model may be used directly by the inference engine 1270. In other words, the scene understanding 126 may only include well-trained models, not the mechanism to perform the training process. After running the models through the inference engine 1270, the 2D-3D projection module 1272 is configured to project the understanding of the scene obtained from the 2D images to the 3D plane map, so as to update the 3D plane map to form the 3D scene map.

As shown in FIG. 2C, the offline training module 1260 includes an image recognition model 1262, an image segmentation model 1264, an image classification model 1266, and an image depth model 1268. In certain embodiments, the labeled image dataset includes a plurality of 2D images. In certain embodiments, the number of the labeled 2D images are over thousands or over millions, and each of the 2D images has an associated category of the scene (e.g. bedroom, kitchen, etc.). In certain embodiments, objects in each of the 2D images are respectively surrounded by bounding boxes, and labeled with the category or name of the object, such as a table or a chair. In certain embodiments, each of the image recognition model 1262, the image segmentation model 1264, the image classification model 1266, and the image depth model 1268 are machine learning mechanisms or neural networks such as region-based convolutional neural networks (R-CNNs). After offline training, the image recognition module 1262 is able to determine the position and label (name) of the objects and recognize the objects as table, chair, human etc. from an input image; the image segmentation module 1264 is able to segment the input image into segments so as to locate objects and boundaries of the objects; the image classification module 1266 is able to classify the input image to different categories, such as kitchen, living room, etc.; and the image depth module 1268 is configured to estimate depth of the objects. Those machine learning mechanism can be trained offline, and then be used based on the purpose of the AR application 118. In certain embodiments, based on the purpose of a project, the AR application 118 may call one or more of the models 1262-1268. Further, the models 1262-1268 may be function independently, or be performed in a predetermined sequence. For example, the image classification module 1266 may be trained and used before the image recognition module 1262, such that the understanding of a classification of a space, such as a living room, is used to assist the recognition of possible objects in the space. Alternatively, the image recognition module 1262 may be trained and performed before the classification module 1266, such that the recognition of objects in a space is used to assist the recognition of possible classification of the space having the objects. In certain embodiments, the offline training module 1260 may not include all the models 1262-1268, as long as the available models can be trained and used to recognize the objects from the images.

The inference engine 1270 may be part of the AR application 118 installed on the computing device 110, or an independent cloud module that is accessible by the computing device 110. For example, the trained models and the inference engine 1270 may be located at a server computer, and when a plurality of 2D images are uploaded from the computing device 110 to the server computer as input, the inference engine 1270 uses those trained models to analyze the inputted 2D images to generate scene information, such as the location, the boundary and the name of the objects in the images, and sends the information back to the computing device 110, such that the AR application 118 in the computing device 110 can use the information to update the 3D map.

The inference engine 1270 is configured to perform one or more of the models 1262-1268 using 2D images and image features. The 2D images may be inputted directly from the SLAM module 122, from the image/point processing module 124, directly from the visual sensor 150, or via the main controller 120, and the image features are inputted directly from the image/point processing module 124 or via the main controller 120. In certain embodiments, both the 2D images and the image features are directly inputted from the image/point processing module 124. In certain embodiments, the SLAM module 122, the image/point processing module 124 and the scene understanding module 126 use the same set of 2D images.

The inference engine 1270 is configured to run the inputted 2D images with extracted features through one or more of the models 1262-1268 and produce an inference result. In certain embodiments, the inference engine 1270 is implemented using TensorFlow® framework. In certain embodiments, the inference engine 1270 is implemented using the Core ML® to perform inference under Apple's environment. In certain embodiments, when the inference engine 1270 receives the 2D images and the 2D features, the inference engine 1270 performs inference using models through the TensorFlow® under Android™ environment or using the Core ML® under Apple® environment. In certain embodiments, the 2D images and the result of the inference engine 1270 can also be used to retrain the models 1262-1268. The result of the inference engine 1270 is categories of the scene, labels of the objects in the 2D images, and optionally the location (positions) and boundaries of the objects in the 2D images.

The 2D-to-3D projection module 1272 is configured to, after obtaining categories of the scene, locations and bounding boxes of the objects, and labels of the objects in the 2D images by the inference engine 1270, project those features to the 3D plane map, so as to update the 3D plane map to the 3D scene map. During SLAM, the correspondence between the 2D feature points in the 2D images and the 3D feature points in the 3D map have already been established. When the inference engine 1270 determines that a set of 2D feature points in the 2D images belongs to an object, that set of 2D feature points are labeled with the corresponding object. Subsequently, the object label of the 2D feature points is projected to the corresponding 3D feature points, such that the set of 3D feature points also has the label of the object. As an example, the inference engine 1270 recognizes a first set of 2D feature points that belongs to a "table" and a second set of 2D feature points that belongs to a "wall." Then the inference engine 1270 labels the first set of 2D feature points with "table," and labels the second set of 2D feature points with "wall." There are a third set of 3D feature points corresponds to the first set of 2D feature points, and a fourth set of 3D feature points corresponds to the second set of 2D feature points. Accordingly, the inference engine 1270 labels the third set of 3D feature points in the 3D plane map with "table," and labels the fourth set of 3D feature points in the 3D plane map with "wall." As described above, the inference engine 1270 is able to determine the name or category of the objects, such as a table, a chair or a wall. In certain embodiments, the inference engine 1270 is configured to determine style of the objects, such as classic or modern style of a furniture, a contemporary, coastal or modern style of a room. In certain embodiments, the inference engine 1270 is configured to determine function of a room such as a kitchen, a living room, a bedroom; function of a furniture such as dining, office, entertaining, etc.

In certain embodiments, the 3D plane map is labeled using voxels to form the 3D scene map. Specifically, the 3D plane map is divided into voxels in the 3D space, and when available, the voxels are labeled with object name or category based on the scene understanding of the 2D image and the correspondence between the 2D feature points and the 3D feature points. In certain embodiments, the 3D plane map is labeled by planes to form the 3D scene map. Specifically, the 3D plane map is segmented using the fitted planes in the 3D space, and the planes are labeled with object name or category based on the scene understanding of the 2D images and the correspondence between the 2D feature points and the 3D feature points. Therefore, no matter the label is by voxel or by plane, there are one set of 3D feature points that labeled with one object, and another set of 3D feature points that labeled with another object. The updating of the 3D plane map with object labels results in the 3D scene map. In other words, the 3D scene map includes 3D points from the SLAM module 122, planes of arbitrary orientation defined by the image/point processing module 124, and labels of the object names and/or categories of the scene and/or segmentation of the objects in the scene and/or depth values of each pixel in the scene from the scene understanding module 126. In certain embodiments, the data attached to the 3D map may be defined using JSON (JavaScript Object Notation). For example, a scene may have a data structure of:

```
{"scene":{
    "category": "living room",
    "objects": {
        "ID": 0,
        "label": "desk",
        }
    }
}
```

The 3D scene map, as part of the SLAM, is continuously updated by the SLAM module 122. The 3D scene map can then be used by the rendering module 128.

In certain embodiments, the scene understanding module 126 is further configured to provide recommendations of products to a user based on the obtained 3D scene map. In one embodiment, the scene understanding module 126 determines style of the furniture (objects) in an environment using one or more of the models, and based on the style, recommend products that has a style matching the style of the furniture. In another embodiment, empty space in the 3D scene map to place one or more items is determined, and a product that is not existed in the environment and has a size fitting the empty space well is recommended. In a further embodiment, functions of the furniture and appliance in the 3D scene map is determined, and a product having a function that is complementary to the functions of the furniture and appliance is recommended. For example, when a study desk and a chair exist in the 3D scene map, and no lamp is determined on the study desk, the scene understanding module 126 may recommend a lamp to the user, where the style and size of the lamp fits the study desk very well. In certain embodiments, the recommendation is performed by: determining a set of products corresponding to the category of the room, such as sofa and table for a living room; selecting a plurality of products based on the style of the room and the current furniture, such as sofa and table in a modern style because the current furniture style in the living room is modern style; selecting a product with function complementary to the function of the current furniture, such as selecting sofa when there is only a coffee table; and determining the size of the sofa based on the empty space around the recognized table. After that, the 3D model of the recommended sofa can be placed and rendered into the 3D scene map. Kindly note a recommendation may include one or more of the above steps, and the sequence of the steps can be varied based on the user's preference. In certain embodiments, the scene understanding module 126 is coded with C++, which enables the AR application 118 to be usable on different platforms.

Figure 2D:
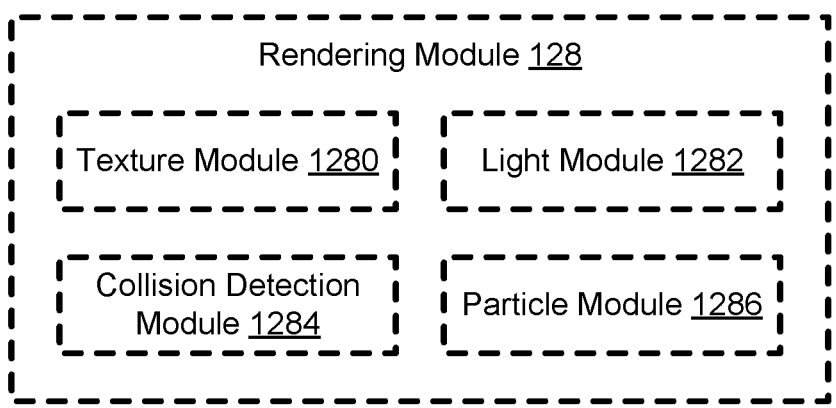
FIG. 2D schematically depicts an exemplary rendering module according to certain embodiments of the present invention.

The rendering module 128 is configured to, when the 3D scene map and a 3D model of a product is available, place and render the 3D model on the 3D scene map, detect collision between the 3D model and the objects in the 3D scene map, i.e. between the virtual objects and the real objects, and providing interaction for the user to operate the 3D model in the 3D scene map. As shown in FIG. 2D, the rendering module 128 includes a texture module 1280, a light module 1282, a collision detection module 1284, and a particle module 1286. In certain embodiments, the texture module 1280 is configured to define high frequency detail, surface texture, or color information on the 3D model; the light module 1282 is configured to define light on the 3D model; the collision detection module 1284 is configured to detect and avoid collision when moving the 3D model in the 3D scene map; and the particle module 1286 is configured to use a large number of very small sprites, 3D models, or other graphic objects to simulate certain kinds of "fuzzy"

phenomena, such as fire, explosions, smoke, moving water, sparks, clouds, fog, or abstract visual effects like glowing trails, magic spells, etc. In certain embodiments, because the objects in the 3D scene map are defined by the 3D coordinates of the points, the planes, the voxels, etc., the collision between the 3D model and the real objects in the environment can be detected. Therefore, when a user moves the 3D model around, for example, an object of sofa or an environment of a wall, the possible collision is detected and the 3D model is stopped at certain position to avoid overlapping with the sofa or the wall. In certain embodiments, when multiple products are selected, and the 3D models of the products are placed in the environment, the overlap between the 3D models are also determined to avoid collision between the 3D models. Thus, the AR application 118 can not only detect and avoid collision between the virtual objects, but also between the virtual objects and real objects.

In certain embodiments, the rendering module 128 is coded using C++, such that the rendering module 128 is cross-platform. In certain embodiments, the rendering module 128 is an open source rendering engine. In certain embodiments, the rendering module 128 is a modified open source rendering engine that fits the purpose of the present invention.

Figure 2E:
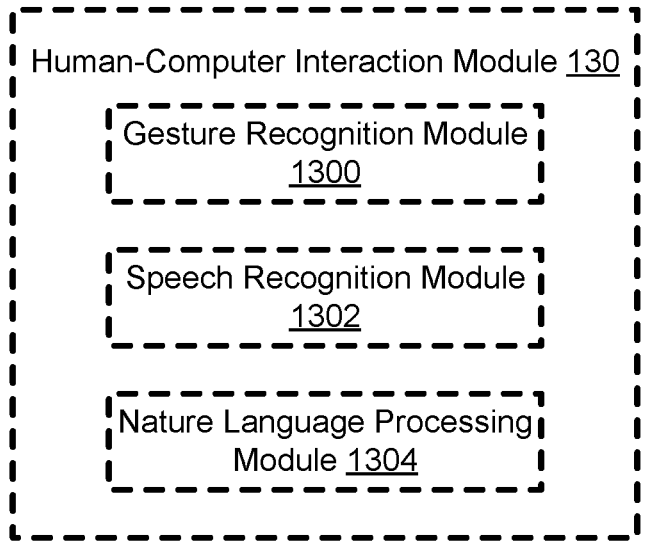
FIG. 2E schematically depicts an exemplary human-computer interaction module according to certain embodiments of the present invention.

The human-computer interaction module 130 is configured to, upon receiving gesture or language from a user, control the 3D model to move in the 3D map. As shown in FIG. 2E, the human-computer interaction module 130 includes a gesture recognition module 1300, a speech recognition module 1302, and a nature language processing module 1304. The gesture recognition module 1300 is configured to interpret gestures originated from any bodily motion or state, such as emotion from face or hand gestures of the user, and use the interpretation to act on the 3D model. The speech recognition module 1302 is configured to recognize and translate spoken language into text, and the natural language processing module 1304 is configured for semantic interpretation of the text obtained by the speech recognition module 1302, so as to use the interpretation to act on the 3D model.

Figure 2F:
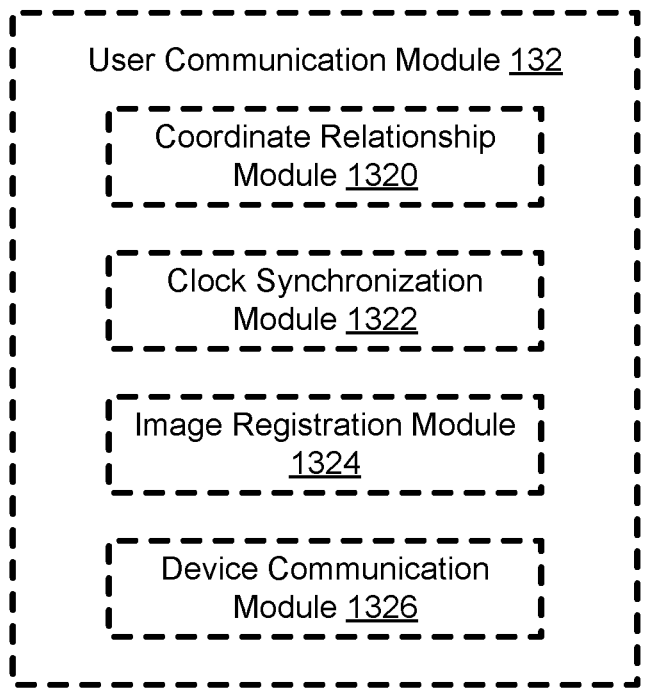
FIG. 2F schematically depicts an exemplary user communication module according to certain embodiments of the present invention.

The user communication module 132 is configured to construct real time communication between different users, or in other words, between different computing devices. As shown in FIG. 2F, the user communication module 132 includes a coordinate relationship module 1320, a clock synchronization module 1322, an image registration module 1324, and a device communication module 1326. The coordinate relationship module 1320 is configured to align the coordinates in the computing device 110 with the coordinates in another computing device. For example, when two users each using a smartphone that runs the AR application 118 on the same environment, the two smartphones may view different parts of the environment, and the two different parts have certain amount of overlapped portion. The two smartphones are able to communicate with each other to align the coordinates in the AR application in one smartphone to the coordinates in the AR application in the other smartphone based on the overlapped portion. The clock synchronization module 1322 is configured to synchronize the images taken by the two users. The image registration module 1324 is configured to register the feature points in the images from one user to the images from the other user. The device communication module 1326 is configured to provide an interface for the communication between the users.

The visual sensors 150 is configured to capture visual images of the environment. The visual sensors 150 includes at least one of grayscale cameras, red, green and blue (RGB) or RGB depth (RGBD) cameras, and depth cameras. In certain embodiments, the visual sensors 150 may also include one-dimensional (single beam) or 2D- (sweeping) laser rangefinders, 3D High Definition LiDAR, 3D Flash LIDAR, 2D or 3D sonar sensors. In certain embodiments, one grayscale image is sufficient for performing SLAM. The visual sensors 150 is controlled by the main controller 120 to capture environment images in real time. The image capturing rate may be defined by the main controller 120 or may be defined by the visual sensors 150 itself. In certain embodiments, the main controller 120 controls the visual sensors 150 to continuously capture environment images at a constant rate.

In certain embodiments, the system 100 may further includes one or more IMUs 170. The IMUs 170 may include accelerometers, gyroscopes, and magnetometers. The main controller 120 would instructs the IMUs 170 to collect specific force, angular rate, and optionally magnetic field at real time.

Figure 3:
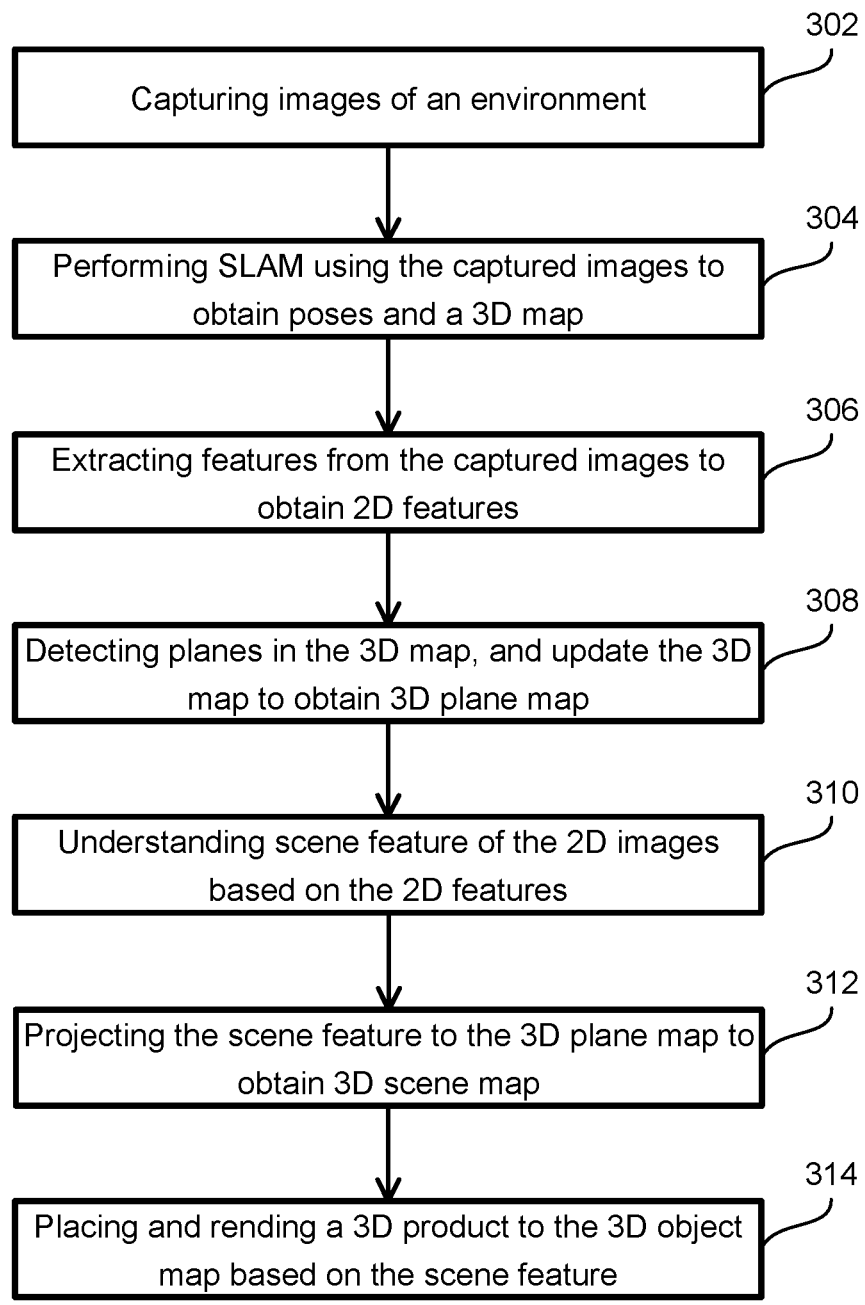
FIG. 3 depicts a flowchart of rendering a three-dimensional (3D) product model to a 3D environment map according to certain embodiments of the present invention.

FIG. 3 depicts a flowchart of rendering a product into an environment according to certain embodiments of the present invention. In certain embodiments, the method is implemented by the system shown in FIG. 1. It should be particularly noted that, unless otherwise stated in the present invention, the steps of the method may be arranged in a different sequential order, and are thus not limited to the sequential order as shown in FIG. 3.

As shown in FIG. 3, at procedure 302, the main controller 120 of the computing device 110 instructs the visual sensors 150, such as one or more cameras, to capture video frames or images of the environment. Optionally, the computing device 110 may also instruct the IMUs 170, such as accelerometers, gyroscopes, and magnetometers, to collect specific force, angular rate, and optionally magnetic field at real time. The main controller 120 receives or retrieves those images from the visual sensors 150, and sends the images to the SLAM module 122, the image/point processing module 124, and the scene understanding module 126. In certain embodiments, the visual sensors 150 may directly send the 2D images to the SLAM module 122, the image/point processing module 124, and the scene understanding module 126. In certain embodiments, the SLAM module 122, the image/point processing module 124 and the scene understanding module 126 may use the same copy of the 2D images.

At procedure 304, upon receiving the images from the visual sensors 150 or via the main controller 120, the SLAM module 122 performs simultaneous localization of the camera and mapping of the environment, and obtains poses of the camera and 3D map of the environment. In certain embodiments, the SLAM process includes detecting features such as corners from the 2D images, extracting feature points from the 2D images, calculating feature descriptors for each feature point, triangulate the feature points in different 2D images to form the 3D map. The formed 3D map comprises point cloud of feature points, and each of the feature points in the point cloud has a specific descriptor.

Before, during or after the procedure 304, the image/point processing module 124 performs procedure 306. Specifically, upon receiving images from the visual sensor 150 or via the main controller 120, the image/point processing module 124 processes the 2D images by: feature detection, feature extraction, and segmentation. For example, if a "table" is present in the 2D images, the image/point processing module 124 is able to recognize corners or lines of the table and feature points of the flat surfaces of the table, define the surfaces of the table based on the feature points, and segment the table from the rest of the images. The segmentation of the table may be performed by defining a bounding box surrounding the table in the 2D image. In certain embodiments, the feature detection by the image/point processing module 124 is more comprehensive than the feature detection by the SLAM module 122. For example, the SLAM module 122 may only detect corner features in the 2D images, and the detected corner features are sufficient for performing SLAM; the image/point processing module 124 may detect corners, edges, blob, ridge, lines, circles, planes, etc. In certain embodiments, the image/point processing module 124 may use the detected corner information from the SLAM module 122, thus does not need to have the corner detection function. In certain embodiments, the image/point processing module 124 is written in a cross-platform language, such as C++, so that the image/point processing module 124 can be used under Android™, iOS, or any other suitable environment. The detected 2D features can then be used to update the 3D map. In certain embodiments, the image/point processing module 124 sends the 2D features to the scene understanding module 126.

After the procedure 304, upon accessing the 3D map from the SLAM module 122, at procedure 308, the image/point processing module 124 detects planes from the 3D map. The procedure 308 may be performed before, during or after the performing of the procedure 306. At procedure 308, the image/point processing module 124 detects multiple forms of planes, and at least includes detection of vertical planes. By detecting horizontal planes, vertical planes, and optionally other skew planes, 3D objects in the 3D map can be defined. Based on the determined 3D planes of the objects and the relative locations of the objects in the 3D space, collision between the virtual objects and real objects can be easily predicted and avoided. When the plane information in the 3D map is obtained, the image/point processing module 124 adds those information to the feature points in the 3D map, to update the 3D map. Specifically, the 3D map includes feature points, and each point has a descriptor. When a plane is determined, the center of the plane, the orientation of the plane, and the length and width of the plane are added to the 3D map, and a set of feature points belong to that plane are labeled. As a result, the 3D map now not only includes feature points with feature descriptors, but also includes labels of the planes and the set of feature points of each plane. The updated 3D map is named 3D plane map. In certain embodiments, the 3D plane map is still part of the SLAM, and is updated by the SLAM module 122 using continuously inputting 2D images.

At procedure 310, upon receiving 2D images and 2D features, the scene understanding module 126 processes the 2D images and the detected 2D features to understand the scene. In certain embodiments, the 2D images are received from the visual sensor 150, via the main controller 120, from the SLAM module 122, or from the image/point processing module 124. In certain embodiments, the SLAM module 122, the image/point processing module 124 and the scene understanding module 126 use the same set of 2D images. The 2D feature are received form the image/point processing module 124. In certain embodiments, the scene understanding module 126 uses a variety of models to recognize the objects in the 2D images. In certain embodiments, the object detection method includes Fast R-CNN and you only look once (YOLO). The object detection method uses the images and produces what and where are the objects. For example, in an image with a "chair," a "monitor" and a "person," the object detection method is able to determine the locations of the objects, and recognize the name, category, and style of the objects. In certain embodiments, each object is identified by a rectangular box surrounding the objects in the 2D image.

At procedure 312, when the types and locations of the objects are understood, the scene understanding module 126 further projects the object information to the 3D plane map based on the correspondence between the 2D feature points and the 3D feature points, and update the 3D plane map to obtain 3D scene map. As a result, the 3D scene map not only include feature points, feature point descriptors, and planes, but also the objects information, such as a table, a wall, or a chair, and style of the objects such as modern style and classic style. The label of the object may be performed by labeling a set of feature points corresponding the object.

As one example, the 3D map constructed by the SLAM module 122 at procedure 304 includes the following feature points, each with a specific descriptor: point 001, descriptor 001; point 002, descriptor 002 . . . point 099, descriptor 099; point 100, descriptor 100; point 101, descriptor 101; point 102, descriptor 102 . . . point 149, descriptor 149; point 150, descriptor 150; point 151, descriptor 151 . . . point 199, descriptor 199 . . . The scene understanding module 126 processes the 2D features and 2D images at procedure 310, and determines that the 2D feature points corresponding to the 3D feature points 001-199 belong to a "table 1." The scene understanding module 126 may further determines that the 2D feature points corresponding to the 3D feature points 001-100 belongs to one plane, a top surface of the table 1; the 2D feature points corresponding to the 3D feature points 101-149 belongs to another plane, a left side-surface of the table 1; and the 2D feature points corresponding to the 3D feature points 150-199 belongs to yet another plane, a right side-surface of the table 1. In certain embodiments, the table 1 may be determined by the scene understanding module 126 as having classic style, and the classic style is also added as a label to the corresponding feature points in the 3D map. Combining the above information, and optionally the plane fitting information by the image/point processing module 124, the scene understanding module 126 updates the 3D plane map to obtain the 3D scene map. As a result, each object in the 3D scene map is defined as comprising a set of feature points, having fitted planes, and labeled with the name, category and style of the objects. With the 3D information of the objects in the 3D scene map, it is possible to detect and avoid collision when rendering a 3D model of a product into the 3D map. The 3D scene map is accessible by the rendering module 128.

In certain embodiments, the scene understanding module 126 is further configured to, when the 3D scene map is available, provide recommendation of products for the user. The 3D scene map includes style of the furniture in the environment, and accordingly, the scene understanding module 126 is configured to recommend a product that matches the style of the furniture. The 3D scene map includes sizes of the furniture in the environment, and accordingly, the scene understanding module 126 is configured to recommend a product that matches the size of one or more of the furniture.

At procedure 314, when the 3D scene map is available, the rendering module 128 renders a 3D model of a product into the 3D scene map. In certain embodiments, the product is the one recommended by the scene understanding module 126 at procedure 312. When the scene understanding module 126 recommends more than one products, the AR application 118 may further provide an interface for the user to select one or more products from the recommended products. In certain embodiments, the user may select the product without the need of recommendation. When the product is selected or recommended, the 3D model of the product is rendered into the 3D scene map. The 3D scene map includes the understanding of the scene, such as the function and the dimensions of the objects, and the rendering module 128 uses the information to render the 3D model. Firstly, the rendering module 128 may perform an area selection by placing the 3D model in an area or a surface in the 3D scene map that matches the function of the product. For example, the 3D scene map includes location and dimension of walls in the environment, and when a painting is selected as the product, the rendering module 128 renders the painting on one of the walls based on the scene understanding. When a TV is selected as the product, the rendering module 128 places the TV on a TV table or a TV stand based on the scene understanding. Secondly, the rendering module 128 may perform location determination by placing the 3D model in a suitable location in the selected area based on the scene understanding. For example, the rendering module 128 places the painting at certain height on the wall, or places the TV directly on the top surface of the TV stand, based on the scene understanding of the dimensions of the walls and the TV stand. Thirdly, during rendering of the product, the rendering module 128 detects and avoids collision based on the locations and dimensions of the different objects in the 3D scene map. For example, when the rendering module 128 determines a space between a wall and a table for placing a sofa, the rendering module 128 would avoid collision during the process based on the locations and dimensions of the wall and the table.

Figure 4:
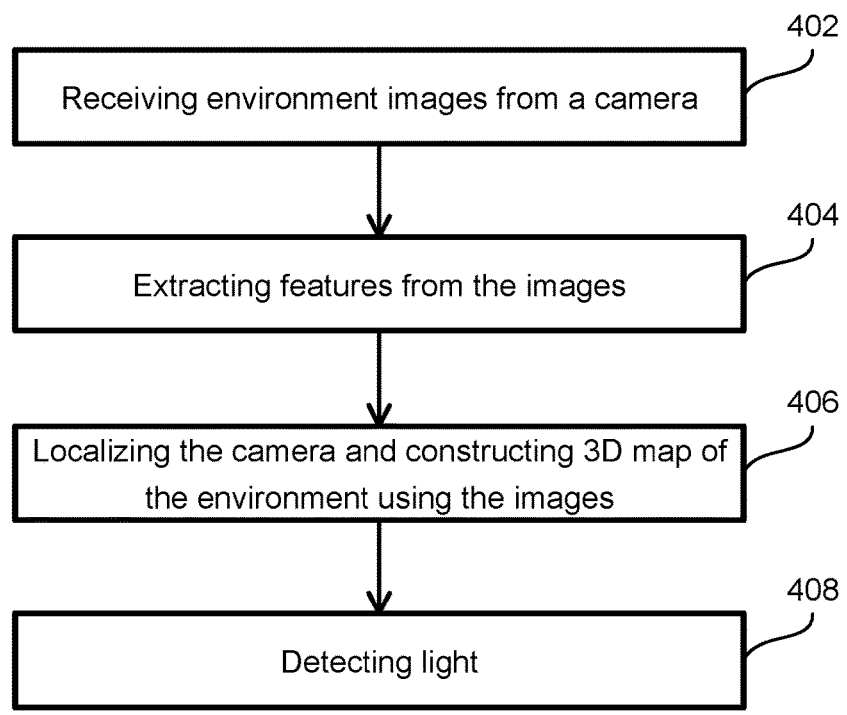
FIG. 4 depicts a flowchart of SLAM according to certain embodiments of the present invention.

FIG. 4 schematically shows an example of SLAM according to certain embodiments of the present invention. In certain embodiments, the example is performed by a computing device, such as the computing device 110 shown in FIG. 1. After the visual sensors 150 capture images of the environment, at procedure 402, the SLAM module 122 receives those images from the visual sensors 150 or the main controller 120. At procedure 404, the feature extraction module 1220 extract feature points from the images and calculate feature descriptors of the extracted feature points. In certain embodiments, the feature extraction module 1220 also detect corners from the feature points. At procedure 406, the localization and mapping module 1222 performs SLAM using those extracted feature points to obtain poses of the visual sensors 150 and construct a 3D map. At procedure 408, the light detection module 1224 detects light direction and intensity in the scene. When IMUs 170 are available, before the procedure 406, the fusion module 1226 may receive information from IMUs 170 and fuse those information with the captured images to obtain fused data, and send the fused data to the localization and mapping module 1222 to perform SLAM. In certain embodiments, the method shown in FIG. 4 is performed using ARKit or ARCore, which are incorporated herein by reference in their entireties. In other embodiments, the SLAM module 122 is a customized module that is compatible with different operating systems, such as Android™, iOS™ and Windows™.

Figure 5A:
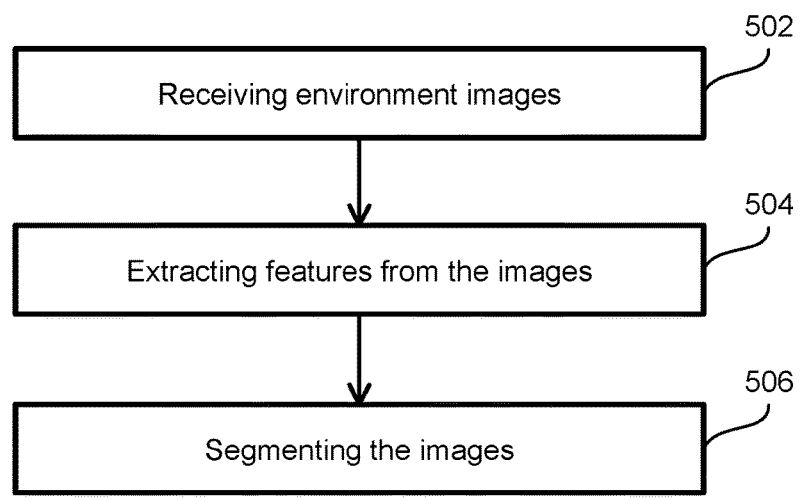
FIG. 5A depicts a flowchart of image/point processing according to certain embodiments of the present invention.

FIG. 5A schematically shows an example of 2D image/point processing according to certain embodiments of the present invention. In certain embodiments, the example is performed by a computing device, such as the computing device 110 shown in FIG. 1. As shown in FIG. 5A, at procedure 502, the image/point processing module 124 receives 2D images and detected corner information from the SLAM module 122. In certain embodiments, the image/point processing module 124 may also receive the images from the visual sensor 150 or receive the images and the corner features via the main controller 120. Then at procedure 504, the image feature extraction module 1246 extract features other than the corners, such as edges, blob, ridge, lines, circles, etc. Optionally, when the image/point processing module 124 receives original images from the visual sensor 150, it is further configured to detect corners from the original images. After detecting and extracting those features, at procedure 506, the image segmentation module 1248 segments dominant objects, such as a desk, a monitor, a chair, a door, a window, or a wall in the image. Although those objects are recognized to an extent that they can be differentiated from each other, here they are not recognized as the desk, the monitor, the chair, the door, the window, the wall yet. Those segmented objects in the 2D images then can be used for scene understanding. In certain embodiments, the 2D features can be projected to the 3D map. In certain embodiments, the procedures 504 and 506 may be arranged in a different sequential order. In certain embodiments, not all of the procedures 504 and 506 are required for a project.

Figure 5B:
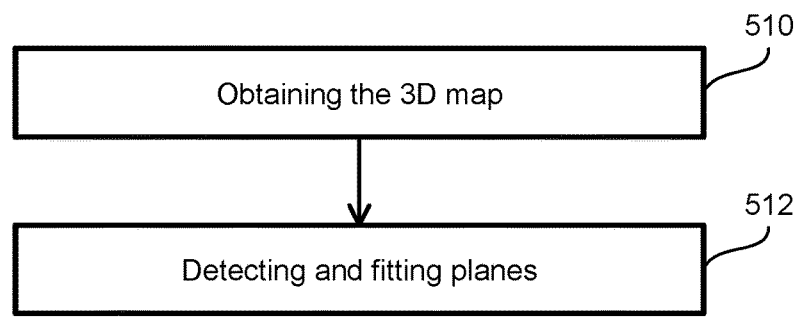
FIG. 5B depicts a flowchart of 3D map processing according to certain embodiments of the present invention.

FIG. 5B schematically shows an example of image/point processing of the 3D map according to certain embodiments of the present invention. In certain embodiments, the example is performed by a computing device, such as the computing device 110 shown in FIG. 1. As shown in FIG. 5B, at procedure 510, the image/point processing module 124 receives 3D map constructed by the SLAM module 122 directly or via the main controller 120. Then at procedure 512, the point cloud plane fitting module 1240 detects and fits horizontal planes, vertical planes or planes with arbitrary orientations in the 3D map. By detecting planes in variety of directions, the objects in the 3D map can be identified by one or more of those planes. For example, a vertical plane, preferably with edges determined, can be used to define a wall; a horizontal plane and a few vertical planes can be used to define a file cabinet.

Figure 6A:
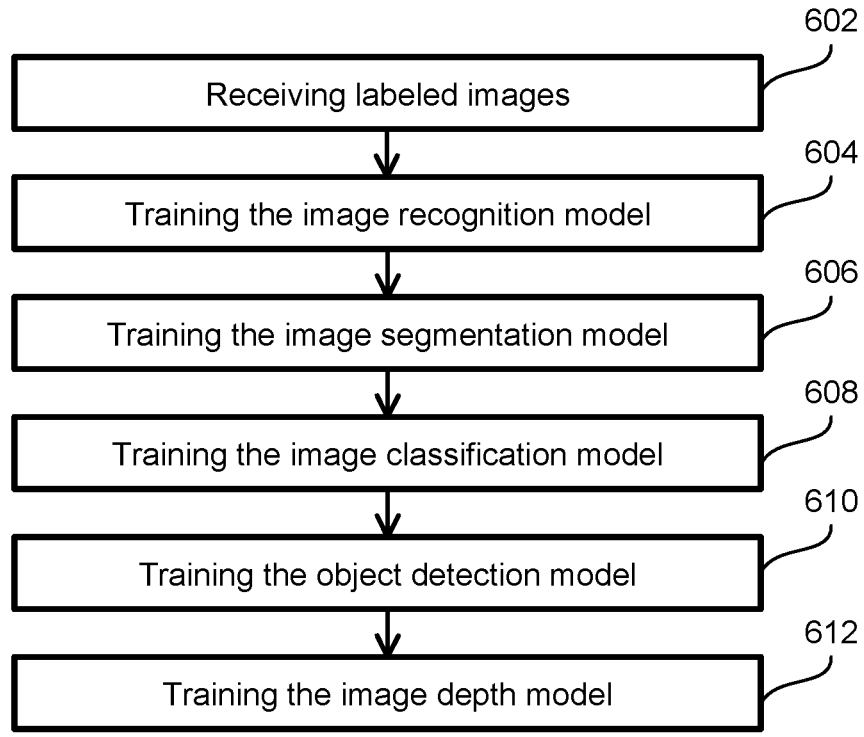
FIG. 6A depicts a flowchart of training a scene understanding module according to certain embodiments of the present invention.

FIG. 6A schematically shows an example of offline training 600A of the scene understanding module according to certain embodiments of the present invention. In certain embodiments, the offline training is performed on a powerful computing device other than the computing device 110, and the computing device 110 can use the well-trained models after the powerful computing device completing the training. In certain embodiments, at procedure 602, the offline training module 1260 receives labeled 2D image dataset. Upon receiving the labeled 2D image dataset, the offline training module 1260 trains the image recognition module 1262 at procedure 604 to determine the position and label (name) of the objects in the labeled images; trains the image segmentation module 1264 at procedure 606 to segment the labeled image into segments so as to locate objects and boundaries of the objects; trains the image classification module 1266 at procedure 608 to classify the images to different categories, such as kitchen, bedroom, chair, sofa, human, etc.; and trains the image depth module 1268 at procedure 612 to estimate depth of the objects. In certain embodiments, the procedures 604-612 may be arranged in a different sequential order or in parallel. In certain embodiments, not all of the procedures 604-612 are required for a project.

Figure 6B:
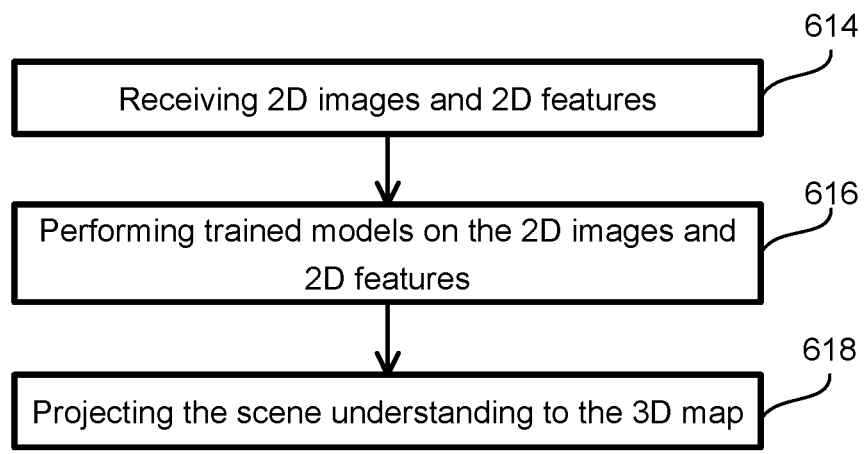
FIG. 6B depicts a flowchart of performing scene understanding according to certain embodiments of the present invention.

FIG. 6B schematically shows an example 600B of running a scene understanding module according to certain embodiments of the present invention. As shown in FIG. 6B, at procedure 614, the inference engine 1270 receives 2D images and 2D features from the image/point processing module 124. As described earlier in this application, the 2D images may also be received from the visual sensor 150, the main controller 120, or the SLAM module 122. In certain embodiments, the SLAM module 122, the image/point processing module 124, and the scene understanding module 126 may use the same set of 2D images. Upon receiving the 2D images and 2D features, at procedure 616, the inference engine 1270, run the chosen algorithm against the 2D images and 2D features. In certain embodiments, the inference engine 1270 might be implemented using Tensor-Flow® or Core ML®. The inference engine 1270 may call one or more models 1262-1268 during the process. After the procedure 616, scene understanding is obtained, which includes location and boundaries, dimensions, names and/or categories, and style of the objects in the 2D images. Then at procedure 618, the 2D-to-3D projection module 1272 projects the information to the 3D plane map based on the correspondence between 2D feature points in the 2D images and 3D feature points in the 3D plane map, so that the 3D plane map is updated as 3D scene map.

Figure 7:
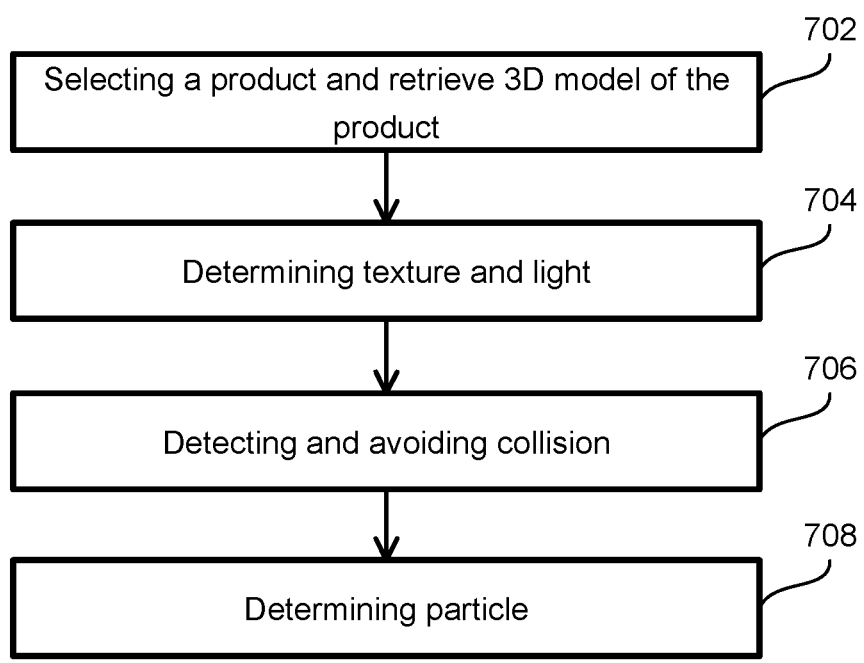
FIG. 7 depicts a flowchart of performing rendering according to certain embodiments of the present invention.

FIG. 7 schematically shows an example of rendering a 3D model and a 3D map according to certain embodiments of the present invention. As shown in FIG. 7, at procedure 702, the scene understanding module 126 recommends a product, or a user selects a product for the environment, and the AR application 118 retrieves a 3D model of the product, for example from an e-commerce server computer. Then at procedure 704, the texture module 1280 defines texture of the 3D model, and the light module 1282 defines light on the 3D model; at procedure 706, the collision detection module 1284 detects and avoids collision when moving the 3D model in the 3D scene map in real time; and at procedure 708, the particle module 1286 provides special visual effects or animation when the 3D model is about to contact or is in contact with an object in the 3D scene map. In certain embodiments, the procedures 704-708 may be arranged in a different sequential order. In certain embodiments, not all of the procedures 704-708 are required for a project.

In certain examples, image/point processing is performed as follows. The inputs of the image/point processing module include images and point cloud while outputs are 3D information and features in 2D images. When dealing with point cloud, a whole map of the environment is obtained and some planes in specific directions are fitted. While dealing with images, traditional image processing method may be used to get features about images which will be an input for deep learning or scene understanding part. Feature points or lines are extracted, and segmentation is performed, so as to assist the scene understanding of the 2D images. In an example, when a direction of a vertical plane is defined, and a point in the vertical plane is determined according to its coordinate ($x_p$, $y_p$, $z_p$), a painting may be placed on the vertical plane, such that the painting is hanged on the plane, and the center of the painting is placed on the determined point. In another example, a horizontal plane such as floor and a vertical plane such as a wall are determined, and the table is placed on the floor and against the wall. When a product such as a table is placed on the floor, the AR application calculates the distance between the product and the wall in real time, so as to avoid collision between the virtual product and the real wall.

In certain examples, scene understanding is performed by deep learning using 2D images captured by a camera. The AR application uses neural network such as Fast R-CNN and YOLO to do object detection especially in indoor scenes. The AR application uses input images in real time to know what and where is the furniture through scene understanding module 126. The AR application then maps 2D points corresponding to these objects to 3D points through SLAM results. As a result, the AR application is able to learn what and where is the furniture or other object in 3D space based on the recognition of those objects, or in other words, the AR application labels point cloud set in 3D space corresponding to the objects. In an example, a chair, a person and a monitor are detected by the deep learning model from the 2D images. Based on the correspondence between the 2D feature points in the 2D images and the 3D feature points in the 3D map, the 3D feature point sets corresponding to the chair, the person and the monitor are respectively labeled, such that the location and occupancy of the chair, the person and the monitor in the 3D space are directly available from the 3D map.

In certain examples, the AR application according to certain embodiments of the present invention is used for collision detection. As described above, the location and occupancy of the real objects in the 3D space have been labeled by the image/point processing module of the AR application. When the rendering module of the AR application moves the virtual objects (3D model of a product), animation can be made to show collision and collision can be avoided.

In certain examples, the AR application according to certain embodiments of the present invention is used for intelligent placement. As described above, the location and occupancy of the real objects in the 3D space have been labeled by the image/point processing module of the AR application. When some virtual commodities are placed in the 3D map, the AR application is able to automatically place the virtual commodities in a suitable position, such as automatically placing a virtual chair near a real desk.

In certain examples, the AR application according to certain embodiments of the present invention is used for commodity recommendation. As described above, the scene understanding module of the AR application understands the environment around the user. With the understanding, the AR application may be further configured to recommend commodities for users more accurately. For example, if the AR application detects a desk in a room of the user, the AR application is configured to recommend such as lamp or chair to a customer.

Figure 8:
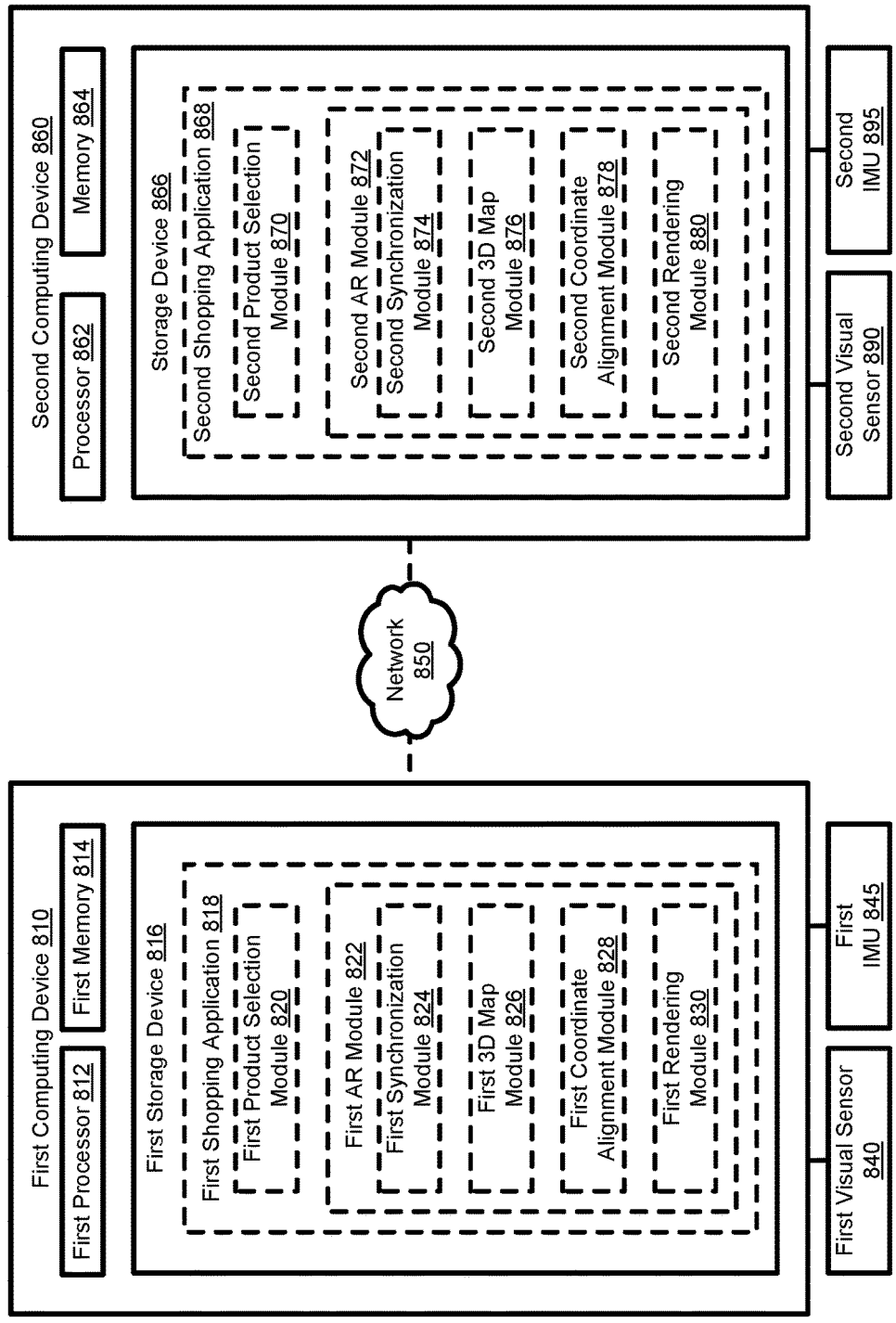
FIG. 8 schematically depicts a multiuser augmented reality (AR) shopping system according to certain embodiments of the present invention.
Figure 9:
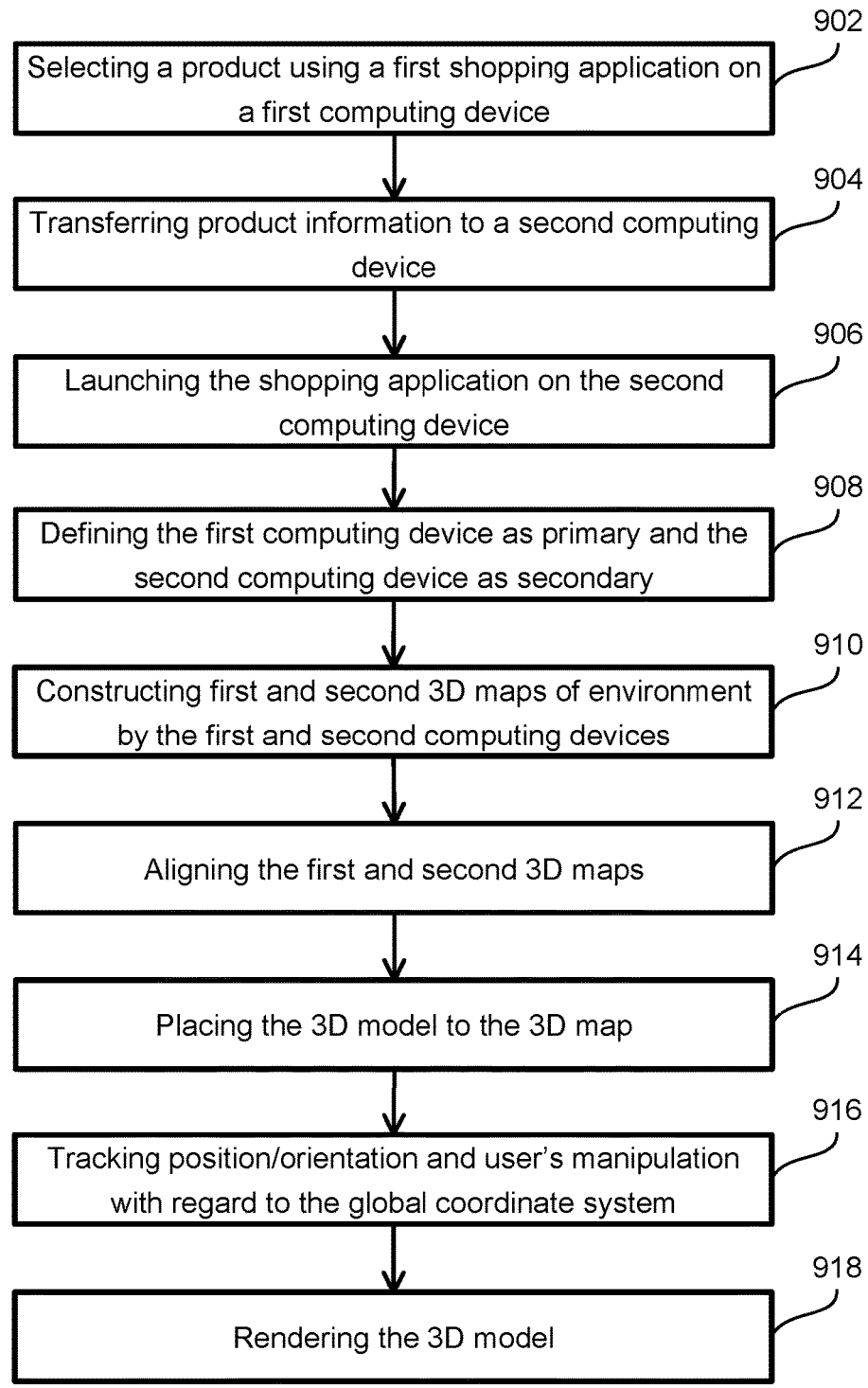
FIG. 9 depicts a flowchart of performing a multi-user AR shopping according to certain embodiments of the present invention.

In certain aspects, the present invention relates to multi-user communication. In certain embodiments, the communication involves augmented reality (AR) shopping. FIG. 8 schematically depicts an AR shopping system according to certain embodiments of the present invention, and FIG. 9 depicts a flowchart of performing a multi-user AR shopping according to certain embodiments of the present invention.

FIG. 8 schematically depicts a multi-user augmented reality shopping system according to certain embodiments of the present invention. As shown in FIG. 8, the system 800 includes a first computing device 810 and a second computing device 860. The first and second computing devices 810 and 860 are in communication with each other via a network 850. Each of the first and second computing devices 810 and 860 may be the same as or similar to the computing device 110. The first and second computing devices 810 and 860 may also be respectively named primary and the secondary computing devices. The system 800 may further include other computing devices that are in communication with the first computing device 810 or/and the second computing device 860. The computing devices in the system 800 may be the same or different in configuration, but all of them has a corresponding shopping application and is able to communicate with each other and share data using the shopping application. In certain embodiments, the network 850 may be a wired or wireless network, and may be of various forms. Examples of the network 850 may include, but is not limited to, a local area network (LAN), a wide area network (WAN) including the Internet, or any other type of networks. The best-known computer network is the Internet.

As shown in FIG. 8, the first computing device 810 may include, without being limited to, a first processor 812, a first memory 814, and a first storage device 816. The first computing device 810 may be integrated with one or more first visual sensors 840, and optionally one or more inertial measurement units (IMUs) 845 to form, for example a mobile device such as a smart phone. As shown in FIG. 8, the first storage device 816 includes a first shopping application 818. In certain embodiments, the first shopping application 818 provides an augmented reality (AR) function for online shopping. Alternatively, the first shopping application 818 may also be performed offline.

The first shopping application 818 includes, among other things, a first product selection module 820 and a first AR module 822. The first AR module 822 includes a first synchronizing module 824, a first 3D map module 826, a first coordinate alignment module 828 and a first rendering module 830. The first product selection module 820 is configured to provide an interface for a first user to browse products on an e-commerce server, select one or more products that he is interested in, and send the selection to the first synchronization module 824. The first synchronization module 824 is configured to, upon receiving the selection from the first product selection module 820, retrieve or download the product information from the e-commerce website, and send the product information to the second synchronization module 874. The downloaded product information may include identification of the product, category and name/title of the product, and 3D model of the product. In certain embodiments, as described above, the first product selection module 820 is further configured to send the product information or part of the product information to the second computing device 860. The sending of the product information may be in a form of a pushed notification. In response to receiving the push notification having product information, the second computing device 860 launches the second shopping application 868. After the second shopping application 868 is in operation, the second synchronization module 870 is configured to extract the product information from the notification. In certain embodiments, the first synchronization module 824 may only send the identification or URL of the product to the second computing device 860, and the second synchronization module 874, upon extracting the identification or the URL from the notification, download all the product information from the e-commerce server. Further, the second synchronization module 874 is configured to send a request to the first synchronization module 824, and communicate with the first synchronization module 824 to establish a primary-secondary relationship between the first computing device 810 and the second computing device 860, where the first computing 810 is determined to be the primary device and the second computing device 860 is determined to be the secondary device. In certain embodiments, the first and second shopping applications 818 and 868 may also provide options for the users to determine the primary-secondary relationship arbitrarily. Once the primary-secondary relationship is established, the first synchronization module 824 and the second synchronization module 874 are configured to synchronize the clocks of the two computing devices. In certain embodiments, if the first visual sensor 840 and the second visual sensor 890 capture the environment images at different frame rate, the synchronization of the clock makes the communication between the two devices at the same pace and corresponds the first images and the second images based on their capture time. In certain embodiments, when the first shopping application 818 places the 3D model in the first 3D map, the first synchronization module 824 is configured to communicate the position and orientation of the 3D model in the first 3D map with the second synchronization module 874, and the second synchronization module 874 is configured to place the 3D model into the second 3D map based on the position and orientation of the 3D model in the first 3D map and the transformation between the second 3D map and the first 3D map. The communication between the first synchronization module 824 and the second synchronization module 874 is a two-way communication. Once the 3D model is moved or rotated by one user on his computing device, the transformation of the 3D model is transferred at real time to the other computing device, such that the other device synchronizes the same move or rotation of the 3D model in the corresponding 3D map. The first 3D map module 826 is configured to, when the primary and secondary relationship between the first and second computing devices 810 and 860 is established, instruct the first visual sensor 840 and the first IMU 845 to collect first images of the environment and IMU information of the first computing device 810, and construct a first 3D map of the environment based on collected first images and optionally the collected IMU information. In certain embodiments, the first 3D environment map module 826 is configured to construct the first 3D map using simultaneous localization and mapping (SLAM), where both the first 3D map of the environment and the poses of the first visual sensor 840 (or poses of the first computing device 810) are obtained. Similarly, the second 3D map module 876 is configured to, when the primary and secondary relationship between the first and second computing devices 810 and 860 is established, instruct the second visual sensor 890 and the second IMU 895 to collect images of the environment and IMU information of the second computing device 860, and construct a second 3D map of the environment. In certain embodiments, the second 3D map module 876 is configured to construct the second 3D map using SLAM, where both the second 3D map of the environment and the poses of the second computing device 860 are obtained. With the continuous capturing of new images by the first and second visual sensors 840 and 890, the first and second 3D map modules 826 and 876 are configured to update the first and second 3D maps. The first 3D map may use the starting position and orientation of the first camera device 810 to establish the coordinate system of the first 3D map, and the second 3D map may use the starting position and orientation of the second camera device 860 to establish the coordinate system of the second 3D map. Thus, the first 3D map and the second 3D map have different coordinate systems. The first and second 3D map modules 826 and 876 are further configured to update the first and second 3D maps at real time. In certain embodiments, the first 3D map may also be named primary 3D map, and the second 3D map may also be named secondary 3D map when it is established that the first and second computing devices have a primary-secondary relationship. The first coordinate alignment module 828 is configured to send the constructed first 3D map to the second coordinate alignment module 878. Upon receiving the first 3D map, the second coordinate alignment module 878 is configured to align the second 3D map to the first 3D map, and transform the coordinate system of the second 3D map to the coordinate system of the first 3D map. In certain embodiments, the second coordinate alignment module 878 is configured to match the feature points in the second 3D map to the feature points in the first 3D map, and transform the coordinates in the second 3D map to the coordinates in the first 3D map based on the matched feature points. In certain embodiments, first key frames exist during the construction of the first 3D map, and second key frames exist during the construction of the second 3D map. The first coordinate alignment module 828 is configured to send the first key frames or feature points from the first key frames to the second alignment module 878, the second coordinate alignment module 878 is configured to match feature points in the second key frames to the feature points from the first key frames. Based on the correspondence between the first 3D map and the first key frames, and the correspondence between the second 3D map and the second key frames, the second coordinate alignment module 878 is configured to transform the coordinate system of the first 3D map to the coordinate system of the second 3D map. In certain embodiments, the matching between the feature points in the first and second 3D maps or the matching between the feature points in the second images (or key frames) to the first 3D map are also named image registration. The first rendering module 830 is configured to, after alignment between the first 3D map and the second 3D map is performed, place and render the 3D model to the first 3D map.

In certain embodiments, the first and second shopping applications 818 and 868 may further include a device communication function, which provides interfaces for the communication between the users. In certain embodiments, each of the first and second rendering modules 830 and 880 is configured to, when the 3D map and the 3D model of the product is available, place and render the 3D model on the 3D map, and provide interactions for the user to operate the 3D model in the 3D map. In certain embodiments, the rendering modules include a texture function to define high frequency detail, surface texture, or color information on the 3D model; a light function to define light on the 3D model; a collision function to detect and avoid collision when moving the 3D model in the 3D map; and a particle function to use a large number of very small sprites, 3D models, or other graphic objects to simulate certain kinds of "fuzzy" phenomena, such as fire, explosions, smoke, moving water, sparks, clouds, fog, or abstract visual effects like glowing trails, magic spells, etc. In certain embodiments, the first and second shopping applications 818 and 868 may further include a human-computer interaction module, which is configured to, upon receiving gesture or language from a user, control the 3D model to move in the 3D map.

FIG. 9 depicts a flowchart of multi-user shopping according to certain embodiments of the present invention. In certain embodiments, the method 900 is implemented by the system shown in FIG. 8. It should be particularly noted that, unless otherwise stated in the present invention, the steps of the method may be arranged in a different sequential order, and are thus not limited to the sequential order as shown in FIG. 9.

As shown in FIG. 9, at procedure 902, a first user uses a first computing device 810 to launch the first shopping application 818. The first product selection module 820, when in operation, provides an interface such that the first user can browse one or more e-commerce platforms corresponding to the shopping application 818, and select one or more products of interest through the interface. In response to the selection of the product, the product selection module 820 sends the selection to the first synchronization module 824 of the first AR module 822. In certain embodiments, the production selection 820 may not be a part of the shopping application 818. For example, the first user may use a web browser to browse a website of the e-commerce platform, select the product via the web browser, and send the selected product into the shopping application 818, so as to trigger the initialization of the shopping application 818.

After selection of the product of interest, at procedure 904, the first synchronizing module 824 downloads the product information from the e-commerce platform and sends the product information or part of the product information to the second computing device 860. The product information may be sent in a form of a pushed notification. The pushed notification may include a complete entry of registered information of the product or simply an identification or URL of the product. The registered information, which are provided by the seller and/or the e-commerce platform, may include identification, category, name, description, and 3D model of the product. In certain embodiments, the pushed notification may include other functions such as triggering initialization of the AR shopping application installed on the second computing device 860.

At procedure 906, in response to receiving the notification from the first computing device 810, the second computing device 860 launches the second shopping application 868. After initialization of the second shopping application 868, the second synchronization module 874 extracts the product information from the notification. If the extracted information is a part of product information, for example only the identification or URL of the product, the second synchronization module 874 further downloads other necessary product information from the e-commerce server. The necessary information may include category, name, 3D model, and material of the product.

At procedure 908, when the second shopping application 868 is initialized and the product information is downloaded, the second synchronizing module 874 sends a request to the synchronizing module 824, to establish a primary-secondary relationship between the first computing device 810 and the second computing device 860, where the first computing device 810 is determined to be the primary device and the second computing device 860 is determined to be the secondary device. In certain embodiments, when more than two computing devices are connected, the synchronizing modules of those computing devices may define one as primary device and all the other as secondary devices. In certain embodiments, the primary and the secondary relationship may also be switched using an instruction generated by the users. The first and second synchronization modules 824 and 874 respectively send the primary-secondary relationship to the first and second 3D map modules 826 and 876. In certain embodiments, the procedure 908 may also include synchronization of the clocks between the two computing devices.

Then at procedure 910, in response to receiving the primary-secondary relationship from the first synchronization module 824, the first 3D map module 826 instructs the first visual sensor 840 to capture images of the environment, instructs the first IMU 845 to collect IMU information of the first computing device 810, and constructs a first 3D map of the environment and obtains the poses of the first computing device 810 based on the captured images and the collected IMU information. In certain embodiments, the first 3D map module 826 constructs the first 3D map using SLAM. Similarly, in response to receiving the primary-secondary relationship from the second synchronization module 874, the second 3D map module 876 instructs the second visual sensor 890 to capture images of the environment, instructs the second IMU 895 to collect IMU information of the second computing device 860, and constructs a second 3D map of the environment and obtains poses of the second computing device 860 based on the captured images and the collected IMU information. In certain embodiments, the second 3D map module 876 constructs the second 3D map using SLAM. The first 3D map may use the starting position and orientation of the first camera device 810 to establish the coordinate system of the first 3D map, and the second 3D map may use the starting position and orientation of the second camera device 860 to establish the coordinate system of the second 3D map. Thus, the first 3D map and the second 3D map have different coordinate systems. In certain embodiments, the visual sensors 840 and 890 have overlapped field of view. In other words, the first visual sensor 840 and the second visual sensor 890 at least capture images of some common areas of the environment. Correspondingly, the first 3D map and the second 3D map include feature points corresponding to common area of the environment. After construction of the first and second 3D maps, the first 3D map module 826 and the second 3D map module 876 respectively notify the first and second coordinate alignment modules 828 and 878.

In response to receiving the notifications that the first and second 3D maps are constructed, at procedure 912, the first and second coordinate alignment modules 828 and 878 align the first and second 3D maps. In certain embodiments, the first coordinate alignment module 828 sends the first 3D map to the second coordinate alignment module 878, and upon receiving the first 3D map, the coordinate alignment module 878 compares the feature points in the first 3D map and the second 3D map to locate matched feature points and then align the second 3D map to the first 3D map by transforming the coordinates of the second 3D map to the coordinates in the first 3D map. In certain embodiments, first key frames exist during the construction of the first 3D map, and second key frames exist during the construction of the second 3D map. The first coordinate alignment module 828 sends the first key frames or the feature points from the key frames to the second alignment module 878, the second coordinate alignment module 878 matches feature points in the second key frames to the feature points from the first key frames. Based on the correspondence between the first 3D map and the first key frames, and the correspondence between the second 3D map and the second key frames, the second coordinate alignment module 878 transforming the coordinate system of the first 3D map to the coordinate system of the second 3D map.

In certain embodiments, the alignment between the first and second 3D map includes determining a rigid transformation, making a surface representation using feature points and matching the surface representation, and optimizing the matched and optionally unmatched points.

In certain embodiments, the transformation that used to align the second (secondary) 3D map with the first (primary) 3D map is a rigid transformation in 3D space, which comprises of a rotation and a translation. The rotation has three degrees of freedom (DOF) and the translation has three DOF. In certain embodiments, a virtual inertial odometry (VIO) method is applied, which can estimate the ground plane using IMUs. The Y axis of the coordinate system of the second 3D map and the Y axis of the coordinate system of the first 3D map point to the opposite direction of gravity, and the rotation part of the rigid transformation only has one DOF. Accordingly, it is easier to align the second 3D map with the first 3D map. In certain embodiments, the alignment is computed by minimizing an error term. In certain embodiments, the error term can be calculated as average of the squared distances between corresponding feature points. In another embodiments, the error term can be defined as average of the squared distances between sampled points from parametric surface models of the first 3D map and the second 3D map.

In certain embodiments, the structure representation and similarity measure mainly includes feature-based, point-based, and model-based surface representation. In certain embodiments, for feature-based methods, feature refers to compact description of the surface shape. When the features can be matched by comparing scalar values, the transformation can be easily computed directly, for example, by calculating the least squares. In certain embodiments, different transformation methods as described in "Estimating 3-D rigid body transformations: a comparison of four major algorithms" by D. W. Eggert and A Lorusso, R. B. Fisher is applied, which is incorporated herein by reference in its entirety. In certain embodiments, for a point-based method, all or a subset of points are used.

Similarity criterion is the average distance to be minimized between pairs of surface points. In certain embodiments, the correspondence is not known beforehand, but can be recovered by the algorithm during the process. In one example, iterative closest point (ICP) is applied to minimize the difference between two clouds of points consisted in the two 3D maps.

In certain embodiments, the structure representation and similarity measure may further include a method based on global similarity. In certain embodiments, the method registers surfaces on the basis of global surface geometry, that do not rely on a rough prior estimation of the transformation and that may be able to deal with relatively featureless patches.

For further discussion of automatic 3D surface registration, please refer to "An algorithmic overview of surface registration techniques for medical imaging" by Michel Audette et al, which is incorporated herein by reference in its entirety.

The choice of different representations leads to different matching and optimizing method. For feature based approach, feature matching and direct computation is sufficient. For point-based approach, the matching and optimizing may involve iteratively finding the closest points and optimization that minimizes surface-to-surface distance. For model-based approach, surface evolution models can be used or finite element modeling can be applied to model the surfaces.

After a round of alignment, the second coordinate alignment module 878 calculates the alignment error and determines whether the error is greater than a pre-determined threshold. In certain embodiments, the alignment error is defined as the average of squared distances of corresponding point pairs from the two point sets. If the error is greater than the threshold, the second coordinate alignment module 878 sends a notification to the second user, and sends the notification to the first user via the coordinate alignment module 828, such that the first user and the second user can capture more images of the environment, preferably images of common areas. The first 3D map module 826 updates the first 3D map and the second 3D map module 876 updates the second 3D map based on the newly added images. In certain embodiments, the coordinate alignment modules 828 and 878 may provide guidance to capture images based on the alignment result. In certain embodiments, the coordinate alignment modules 828 and 878 provide guidance by leading the first user and the second user to a common area in the environment.

When the alignment error is less than a predetermined threshold, at procedure 914, the coordinate alignment module 878 sends a notification to the first user via the coordinate alignment module 828 or sends a notification directly to the second user, and requests the first user to place the 3D model of the product of interest to the first 3D map. In certain embodiments, the second coordinate alignment module 878 may allow the second user to place the 3D model into the second 3D map instead of the first user. In certain embodiments, the shopping application 818 may also automatically place the 3D model in the environment based on at least one of the first and second 3D maps. The first synchronizing module 824 and the second synchronization module 874 communicate with each other, so that when the 3D model is placed in one of the first and second 3D maps and the position and orientation of the 3D model is defined, the position and orientation can be used to place the 3D model in the other one of the first and second 3D maps. Because the first 3D map and the second 3D map, after alignment, share the same coordinates system, the placing of the 3D model in the two 3D maps is straightforward.

Then the users may move the first and second computing devices 810 and 860 in the environment, the first and second visual sensors 840 and 890 keep capturing new images, and the users may manipulate the 3D model in the environment. Now at procedure 916, the first 3D map module 826 and the second 3D map module 876 track position/orientation and user manipulation with regard to the global coordinate system.

Further, at procedure 918, the first rendering module 830 and the second rendering module 880 also render the 3D model in the 3D maps.

Certain embodiments of the present invention, among other things, have the following beneficial advantages:

(1) The system and method are cross-platform, which can be run under Apple® devices, Android™ devices, Windows® device, etc. The image/point processing module, the scene understanding module and the rendering module are coded with C++, which itself can be recognized and performed under different platforms. Accordingly, if a SLAM system does not rely on the IMUs of a mobile device, then the system can be cross-platform using C++ coded modules. In certain embodiments, the system may also be designed separately for Apple® devices and Android™ devices to take advantage of the inertial sensors on mobile devices.

(2) The system includes the function modules to perform SLAM, image/point processing, scene understanding, rendering, and optionally human-computer interaction. By connecting the functions of those modules together, the present invention provides a one-stop service for AR application, such as AR shopping.

(3) By incorporating the scene understanding module, the system of the present invention understands the style of the objects in the environment and the style of the environment. Based on the scene understanding of the styles, the system can recommend products matching that styles.

(4) By incorporating the SLAM module and scene understanding module, the system of the present invention understands the dimensions of the objects such as size of a TV stand, size of a desk, and the dimensions of the environment such as size of a room. Accordingly, when a product such as a TV with a certain style is selected, the system can determine the suitable size of the TV that matches the size of the TV stand and the size of the room; when a chair with certain style is selected, the system can determine suitable size of the chair that matches the size of the desk; when a dining table is selected, the system can determine the size of the dining table that matches the size of the dining room.

(5) By incorporating the scene understanding module, the system of the present invention understands the positions and surfaces to place the selected product. For example, when a painting is selected, the 3D model of the painting would likely be placed on a wall vertically, when a lamp is selected, the 3D model of the lamp would likely be placed on a top surface of a desk, and when a sofa is selected, the 3D model of the lamp would likely be placed in a large empty space on a floor that is between a coffee table and a wall.

(6) The system recognizes features of the objects in the 2D images, and projects those 2D features to the 3D map. On the one hand, the recognition in the 2D image is fast and accurate. On the other hand, the features projected into the 3D map help the selection of a product, and the placing of the 3D product model in an appropriate position automatically.

(7) Multiple-users can run the same online shopping application and communicate with each other to align their 3D space and share the position and orientation of a 3D model of a product in real time.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope.

Accordingly, the scope of the present invention is defined by the appended claims rather than the foregoing description and the exemplary embodiments described therein.

REFERENCES

1. Ren, Shaoqing, et al. Faster R-CNN: Towards real-time object detection with region proposal networks. Advances in neural information processing systems. 2015.
2. Dong, Jianfeng, Xirong Li, and Cees G M Snoek. Predicting Visual Features from Text for Image and Video Caption Retrieval. arXiv preprint arXiv:1709.01362 (2017).
3. Dong, Hao, et al. I2T2I: Learning Text to Image Synthesis with Textual Data Augmentation." arXiv preprint arXiv: 1703.06676 (2017).

What is claimed is:
1. A system for realizing augmented reality, comprising:
 a visual sensor configured to capture images of an environment; and
 a computing device in communication with the visual sensor, wherein the computing device comprises a processor and a storage device storing computer executable code, and the computer executable code, when executed at the processor, is configured to:
  identify two-dimensional (2D) objects in the captured images;
  construct a three-dimensional (3D) map of the environment using the captured images;

define 3D objects in the 3D map by mapping the 2D objects identified in the captured images to corresponding feature points in the 3D map;

measure dimension and recognize function and style of the 2D objects;

project the 2D objects to the 3D map to define dimension, function and style of the 3D objects in the 3D map corresponding to the 2D objects;

recommend a product that is not present in the environment based on the dimension, function and style of the 3D objects; and place and render a 3D model of the product to the 3D map based on the 3D objects defined in the 3D map, wherein the computer executable code is further configured to recommend a product by:

determining a plurality of products based on a category of the environment;

selecting a first subset of products from the plurality of products based on the style of the 3D objects;

selecting a second subset of products from the first subset of products with a function complementary to the function of the 3D objects; and determining at least one product from the second subset of products that has a size fitting an empty space around the 3D objects.

2. The system of claim 1, wherein the computer executable code is further configured to define 3D objects by determining planes of the 3D objects.

3. The system of claim 2, wherein the planes comprising horizontal planes, vertical planes, and planes with different orientations.

4. The system of claim 2, wherein the computer executable code is further configured to: detect collision between the 3D model and the 3D objects defined in the 3D map based on the planes of the 3D objects.

5. The system of claim 1, wherein the computer executable code is further configured to: place the 3D model in a position in the 3D map based on the dimension, function and style of the 3D objects.

6. The system of claim 1, wherein the computer executable code is configured to:

identify the 2D objects using an image/point processing module; and render the 3D model on the 3D map using a rendering module, wherein both the image/point processing module and the rendering module are coded using C++.

7. The system of claim 1, wherein the computer executable code is configured to define 3D objects in the 3D map by:

determining a plurality of 2D feature points in the captured images that correspond to one of the 2D objects;

determining a plurality of 3D feature points in the 3D map that correspond to the determined 2D feature points; and adding an object label to the determined 3D feature points to define 3D objects corresponding to the 2D objects.

8. The system of claim 1, wherein the computer executable code is further configured to: operate the 3D model on the 3D map in response to a gesture or speech of a user.

9. The system of claim 1, wherein the computer executable code is further configured to: measure dimension; and recognize function and style of the 2D objects using machine learning.

10. A method for realizing augmented reality using a visual sensor and a computing device in communication with the visual sensor, the method comprising:

capturing images of an environment by the visual sensor;

identifying, by the computing device, two-dimensional (2D) objects in the captured images;

constructing, by the computing device, a three-dimensional (3D) map of the environment using the captured images;

defining, by the computing device, 3D objects in the 3D map by mapping the 2D objects identified in the captured images to the corresponding feature points in the 3D map;

measuring dimension and recognizing function and style of the 2D objects;

projecting the 2D objects to the 3D map to define dimension, function and style of the 3D objects in the 3D map corresponding to the 2D objects;

recommending a product that is not present in the environment based on the dimension, function and style of the 3D objects; and placing and rendering, by the computing device, a 3D model of the product to the 3D map based on the 3D objects defined in the 3D map, wherein the step of recommending a product comprises:

determining a plurality of products based on a category of the environment;

selecting a first subset of products from the plurality of products based on the style of the 3D objects;

selecting a second subset of products from the first subset of products with a function complementary to the function of the 3D objects; and determining at least one product from the second subset of products that has a size fitting an empty space around the 3D objects.

11. The method of claim 10, further comprising defining the 3D objects in the 3D map by determining planes of the 3D objects.

12. The method of claim 11, wherein the planes comprising horizontal planes, vertical planes, and planes with different orientations.

13. The method of claim 11, further comprising detecting collision based on the planes.

14. The method of claim 10, further comprising: placing the 3D model in a position in the 3D map based on the dimension, function and style of the 3D objects.

15. The method of claim 10, further comprising measuring dimension; and recognizing function and style of the 2D objects using machine learning.

16. A non-transitory computer readable medium storing computer executable code, wherein the computer executable code, when executed at a processor of a computing device, is configured to:

receive images captured by a visual sensor;

identify two-dimensional (2D) objects in the captured images;

construct a three-dimensional (3D) map of the environment using the captured images;

define 3D objects in the 3D map by mapping the 2D objects identified in the captured images to the corresponding feature points in the 3D map;

measure dimension and recognize function and style of the 2D objects;

project the 2D objects to the 3D map to define dimension, function and style of the 3D objects in the 3D map corresponding to the 2D objects;

recommend a product that is not present in the environment based on the dimension, function and style of the 3D objects; and place and render a 3D model of the product to the 3D map based on the 3D objects defined in the 3D map, wherein the computer executable code is further configured to recommend a product by:

determining a plurality of products based on a category of the environment;

selecting a first subset of products from the plurality of products based on the style of the 3D objects;

selecting a second subset of products from the first subset of products with a function complementary to the function of the 3D objects; and determining at least one product from the second subset of products that has a size fitting an empty space around the 3D objects.

17. The non-transitory computer readable medium of claim 16, wherein the computer executable code is further configured to:

define 3D objects by determining horizontal planes and vertical planes of the 3D objects; and detect collision base on the planes of the 3D objects.

* * * * *